US011679667B2

(12) United States Patent
Sakazaki et al.

(10) Patent No.: US 11,679,667 B2
(45) Date of Patent: Jun. 20, 2023

(54) REFUELING PORT

(71) Applicant: Sumitomo Riko Company Limited, Aichi (JP)

(72) Inventors: Kazushige Sakazaki, Aichi (JP); Makoto Shimojo, Aichi (JP); Eunjin Park, Aichi (JP); Takayuki Kobayashi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/739,165

(22) Filed: May 9, 2022

(65) Prior Publication Data

US 2022/0379720 A1 Dec. 1, 2022

(30) Foreign Application Priority Data

May 27, 2021 (JP) .............................. JP2021-089215

(51) Int. Cl.
*B60K 15/04* (2006.01)
*B60K 15/035* (2006.01)
*B60K 15/03* (2006.01)

(52) U.S. Cl.
CPC ............ *B60K 15/04* (2013.01); *B60K 15/035* (2013.01); *B60K 2015/03328* (2013.01)

(58) Field of Classification Search
CPC .............. B60K 15/04; B60K 2015/047; B60K 2015/0458; B60K 2015/03538
See application file for complete search history.

(56) References Cited

U.S. PATENT DOCUMENTS

| 10,407,295 | B2 * | 9/2019 | Kubo ................... B67D 7/3245 |
| 10,421,353 | B2 | 9/2019 | Sekihara et al. |
| 10,518,633 | B2 | 12/2019 | Sekihara et al. |

(Continued)

FOREIGN PATENT DOCUMENTS

| JP | 6307053 | 4/2018 |
| JP | 6325351 | 5/2018 |

(Continued)

OTHER PUBLICATIONS

WO2012/074003 and translation and/or AI summary (Year: 2023).*

*Primary Examiner* — Timothy P. Kelly
(74) *Attorney, Agent, or Firm* — JCIPRNET

(57) ABSTRACT

The disclosure provides a refueling port capable of simplifying a structure for restricting rotation of a nozzle guide with respect to a refueling port body. One of the refueling port body and the nozzle guide includes guide ribs formed between an inner peripheral surface of a body cylinder portion and an outer peripheral surface of a guide cylinder portion to sandwich a reflux port in the circumferential direction, and guiding fuel vapor flowing in from the reflux port in a direction toward a filler pipe connection port. The other one of the refueling port body and the nozzle guide includes a locking portion formed between the inner peripheral surface of the body cylinder portion and the outer peripheral surface of the guide cylinder portion, and locked in both directions in the circumferential direction to the guide ribs to restrict relative rotation between the refueling port body and the nozzle guide.

16 Claims, 21 Drawing Sheets

(56) References Cited

U.S. PATENT DOCUMENTS

| | | | | |
|---|---|---|---|---|
| 2002/0134461 A1* | 9/2002 | Furuta | ................... | B60K 15/04 |
| | | | | 141/286 |
| 2014/0084005 A1* | 3/2014 | Kito | ................... | B60K 15/077 |
| | | | | 220/304 |
| 2017/0087981 A1* | 3/2017 | Sekihara | ................ | B60K 15/04 |
| 2022/0176812 A1* | 6/2022 | Kito | ....................... | B60K 15/04 |

FOREIGN PATENT DOCUMENTS

| | | | | |
|---|---|---|---|---|
| JP | 6500726 | | 4/2019 | |
| WO | 2015182291 | | 12/2015 | |
| WO | WO-2019149750 A1 * | 8/2019 | ............. | B60K 13/04 |

\* cited by examiner

REFUELING PORT

CROSS-REFERENCE TO RELATED APPLICATION

This application claims the priority benefits of Japanese application no. 2021-089215, filed on May 27, 2021. The entirety of the above-mentioned patent application is hereby incorporated by reference herein and made a part of this specification.

BACKGROUND

Technical Field

The disclosure relates to a refueling port.

Description of Related Art

Patent Documents 1 to 3 describe a refueling port (also referred to as a filler neck) which includes a refueling port body for circulating the fuel supplied from a nozzle of a refueling gun to the filler pipe side, and a cylindrical nozzle guide for guiding the nozzle of the refueling gun arranged inside the refueling port body.

In the refueling port described in Patent Documents 1 and 2, the refueling port body is formed with a reflux port that allows the fuel vapor recirculated via a breather pipe to flow in. The nozzle guide is formed with guide ribs that are formed to sandwich the reflux port in the circumferential direction and guide the fuel vapor flowing in from the reflux port in the direction toward a filler pipe connection port of the refueling port body.

RELATED ART

Patent Documents

[Patent Document 1] Japanese Patent No. 6307053
[Patent Document 2] Japanese Patent No. 6500726
[Patent Document 3] Japanese Patent No. 6325351

SUMMARY

Problems to be Solved

In a state where the nozzle of the refueling gun is inserted into the refueling port, it is necessary to set the position and posture of the nozzle of the refueling gun to a predetermined position and a predetermined posture. Therefore, the positioning of the refueling port body and the nozzle guide is very important. Further, in the configuration in which the fuel vapor is guided from the reflux port of the refueling port body to the filler pipe connection port side of the refueling port body by the guide ribs, the positioning of the refueling port body and the nozzle guide in the rotational direction is very important. If the guide ribs are displaced in the rotational direction, the fuel vapor flowing in from the reflux port of the refueling port body cannot be appropriately guided to the filler pipe connection port side of the refueling port body.

If the positioning means has a complicated structure, the man-hours required for designing the target parts and designing the molding die increase, and consequently the molding cost rises. Therefore, it is desired that the positioning means has a simple configuration. It is also important that the operator can easily confirm the positioning in a state where the nozzle guide has been positioned. Furthermore, it is desired that the nozzle guide can be easily positioned in the rotational direction with respect to the refueling port body while the nozzle guide is inserted into the refueling port body.

In view of such a background, the disclosure provides a refueling port capable of simplifying the structure for restricting the rotation of the nozzle guide with respect to the refueling port body.

Means for Solving the Problems

An exemplary embodiment of the disclosure provides a refueling port including: a refueling port body which is formed for inserting a nozzle of a refueling gun and to which a filler pipe is connected; and a nozzle guide which is cylindrical and arranged inside the refueling port body for guiding the nozzle. The refueling port body includes a body cylinder portion that is formed in a cylindrical shape and has a nozzle insertion port which is located at one end for inserting the nozzle, a filler pipe connection port which is located at the other end and connected to the filler pipe, and a reflux port which is formed on a peripheral surface and into which fuel vapor recirculated via a breather pipe flows. The nozzle guide includes: a guide cylinder portion which is formed in a cylindrical shape and arranged with an outer peripheral surface facing the reflux port inside the body cylinder portion; and a backflow suppression portion which is formed to protrude outward in a radial direction from the outer peripheral surface of the guide cylinder portion and extend in a circumferential direction of the guide cylinder portion and is in contact with a position on an inner peripheral surface of the body cylinder portion on a nozzle insertion port side with respect to the reflux port. One of the refueling port body and the nozzle guide includes a guide rib which is formed between the inner peripheral surface of the body cylinder portion and the outer peripheral surface of the guide cylinder portion to sandwich the reflux port in the circumferential direction and guides the fuel vapor flowing in from the reflux port in a direction toward the filler pipe connection port. The other one of the refueling port body and the nozzle guide includes a locking portion which is formed between the inner peripheral surface of the body cylinder portion and the outer peripheral surface of the guide cylinder portion and is locked in both directions in the circumferential direction to the guide rib to restrict relative rotation between the refueling port body and the nozzle guide.

Effects

In the above refueling port, the nozzle guide is provided with the backflow suppression portion, and one of the refueling port body and the nozzle guide is provided with the pair of guide ribs. In other words, the backflow suppression portion restricts the fuel vapor flowing in from the reflux port of the body cylinder portion of the refueling port body from circulating to the nozzle insertion port side. In addition, the inner peripheral surface of the body cylinder portion of the refueling port body, the outer peripheral surface of the guide cylinder portion of the nozzle guide, and the pair of guide ribs form the guide path from the reflux port of the body cylinder portion of the refueling port body to the filler pipe connection port side of the body cylinder portion. Therefore, the fuel vapor flowing in from the reflux port of the body cylinder portion of the refueling port body is guided to the filler pipe connection port side of the refueling port body by the guide path. Then, the guided fuel vapor is discharged from the refueling port body to the filler pipe by circulation of the fuel supplied from the nozzle of the refueling gun.

Further, one of the refueling port body and the nozzle guide is provided with the pair of guide ribs, and the other one of the refueling port body and the nozzle guide is provided with the locking portion. The locking portion is formed between the inner peripheral surface of the body cylinder portion and the outer peripheral surface of the guide cylinder portion, and is locked in both directions in the circumferential direction to the guide rib to restrict the relative rotation between the refueling port body and the nozzle guide. Therefore, by locking the guide rib and the locking portion, the rotation of the nozzle guide with respect to the refueling port body can be restricted to position the nozzle guide at an appropriate angle.

The guide rib is also used to restrict the rotation of the nozzle guide with respect to the refueling port body. In other words, the guide rib has a function of restricting the rotation of the nozzle guide in addition to a function of guiding the fuel vapor. Further, the guide rib itself has a simple structure. Therefore, the structure can be simplified as compared with the case where a dedicated structure is separately provided for restricting rotation.

DESCRIPTION OF THE EMBODIMENTS (1. Configuration of the Fuel Line 1)

Figure 1:
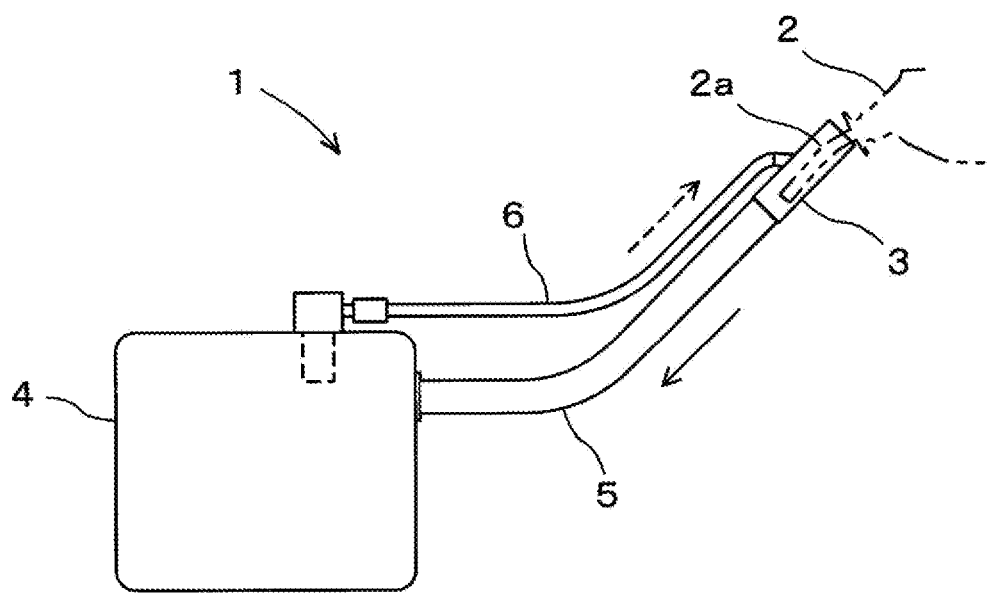
FIG. 1 is a view showing a part of a fuel line.

The configuration of a fuel line 1 will be described with reference to FIG. 1. The fuel line 1 is a line from a refueling port 3 to an internal combustion engine (not shown) in an automobile. However, in the following, the part between the refueling port 3 and a fuel tank 4, which is a part of the fuel line 1, will be described.

The fuel line 1 includes the refueling port 3, the fuel tank 4, a filler pipe 5, and a breather pipe 6. The refueling port 3 is provided near the outer surface of the automobile so that a nozzle 2a of a refueling gun 2 can be inserted into the refueling port 3. The refueling port 3 has a type to which a refueling cap (not shown) is attached and a capless type to which no refueling cap is attached. The fuel tank 4 stores liquid fuel such as gasoline. The liquid fuel stored in the fuel tank 4 is supplied to the internal combustion engine (not shown) and used to drive the internal combustion engine.

The filler pipe 5 (also referred to as a filler tube or a filler hose) is formed of a long resin hose (also referred to as a resin tube). However, the filler pipe 5 may be provided with a joint for connecting hoses if required.

The filler pipe 5 connects the refueling port 3 and the fuel tank 4. The nozzle 2a of the refueling gun 2 is inserted into the refueling port 3, and liquid fuel is supplied from the nozzle 2a, so that the liquid fuel passes through the filler pipe 5 and is stored in the fuel tank 4. Here, when the fuel tank 4 is filled with liquid fuel, liquid fuel is stored in the filler pipe 5 and the liquid fuel touches the tip of the nozzle 2a of the refueling gun 2 whereby the supply of the liquid fuel from the nozzle 2a is automatically stopped (auto stop function).

The breather pipe 6 (also referred to as a breather tube or a breather hose) is formed of a long resin hose (also referred to as a resin tube). However, the breather pipe 6 may be provided with a joint or a valve for connecting hoses if required.

The breather pipe 6 connects the fuel tank 4 and the refueling port 3. The breather pipe 6 is a pipe for recirculating the fuel vapor in the fuel tank 4 to the refueling port 3 when liquid fuel is supplied to the fuel tank 4 via the filler pipe 5. Further, when the fuel tank 4 becomes full and the auto stop function is activated during fuel refueling, the liquid fuel from the fuel tank 4 may recirculate to the refueling port 3 via the breather pipe 6. In this way, the breather pipe 6 at least recirculates the fuel vapor during refueling and further circulates the liquid recirculated fuel at the time of auto stop.

(2. Refueling Port 3 of the First Embodiment)

(2-1. Outline of the Configuration of the Refueling Port 3)

The outline of the configuration of the refueling port 3 according to the first embodiment will be described with reference to FIG. 2 to FIG. 5. The refueling port 3 includes a resin refueling port body 11, a resin nozzle guide 12, an inlet metal fitting 13, and a sealing member 14.

Figure 2:
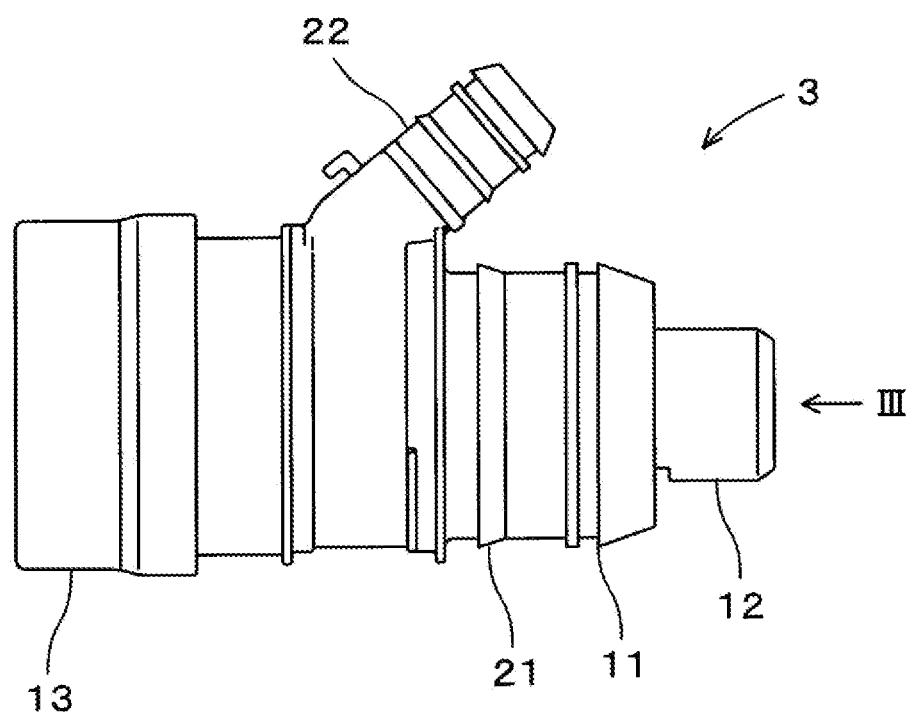
FIG. 2 is a side view of a refueling port according to the first embodiment.
Figure 3:
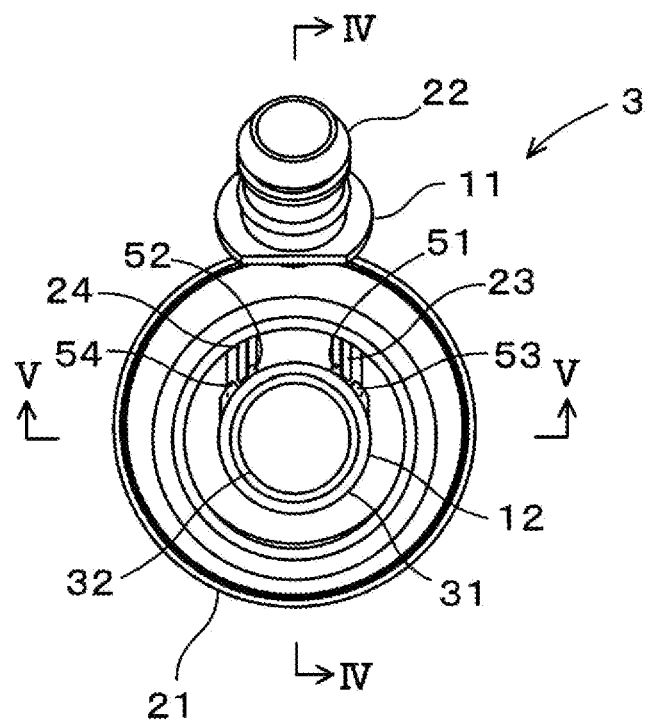
FIG. 3 is a view of the refueling port as viewed from the side opposite to a nozzle insertion port, and is a view as viewed from the direction III of FIG. 2 (right side of FIG. 2).

As shown in FIG. 2, the refueling port body 11 is a member that constitutes the outer shape of the refueling port 3. The refueling port body 11 is molded of resin and is composed of one member in this embodiment. However, the refueling port body 11 may be configured by connecting a plurality of members.

The refueling port body 11 is formed so that the nozzle 2a (shown in FIG. 1) of the refueling gun 2 can be inserted into the refueling port body 11, and the filler pipe 5 (shown in FIG. 1) and the breather pipe 6 (shown in FIG. 1) are connected to the refueling port body 11. Therefore, as shown in FIG. 4 and FIG. 5, the refueling port body 11 includes a nozzle insertion port 21a into which the nozzle 2a can be inserted, a filler pipe connection port 21b to which the filler pipe 5 is connected, and a breather pipe connection port 22a to which the breather pipe 6 is connected.

Figure 4:
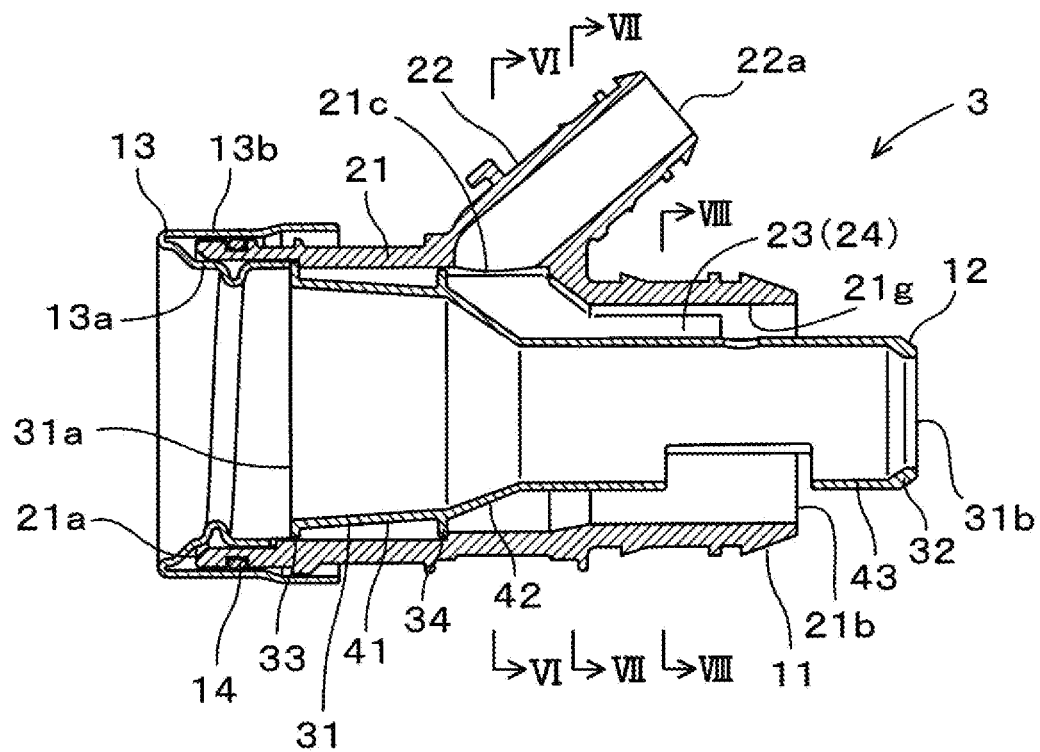
FIG. 4 is an axial cross-sectional view of the refueling port, and is a cross-sectional view along IV-IV of FIG. 3.
Figure 5:
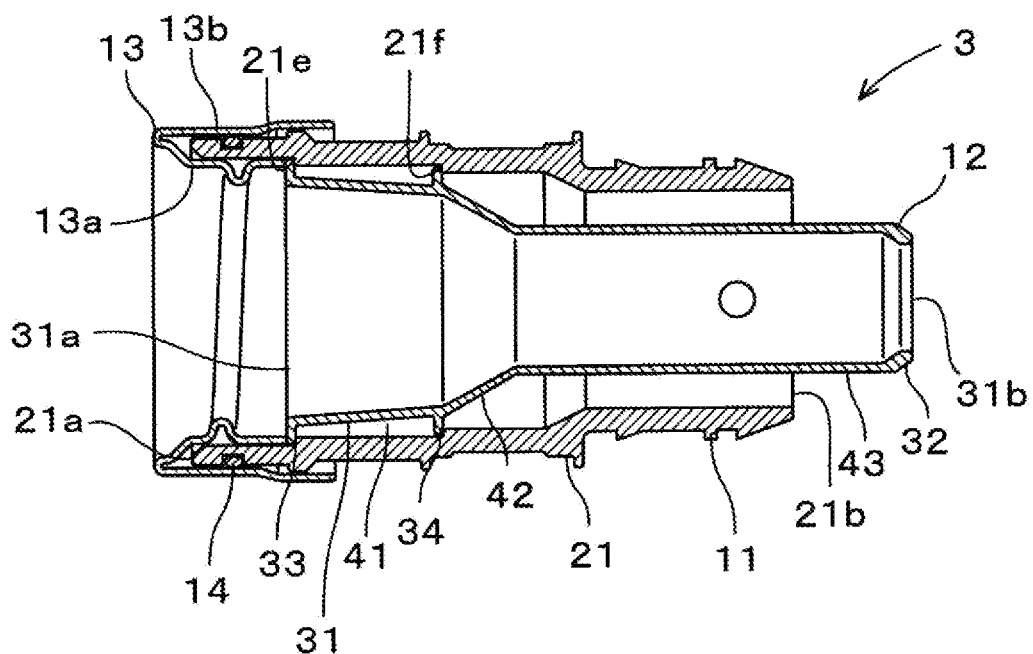
FIG. 5 is an axial cross-sectional view of the refueling port, and is a cross-sectional view along V-V of FIG. 3.
Figure 6:
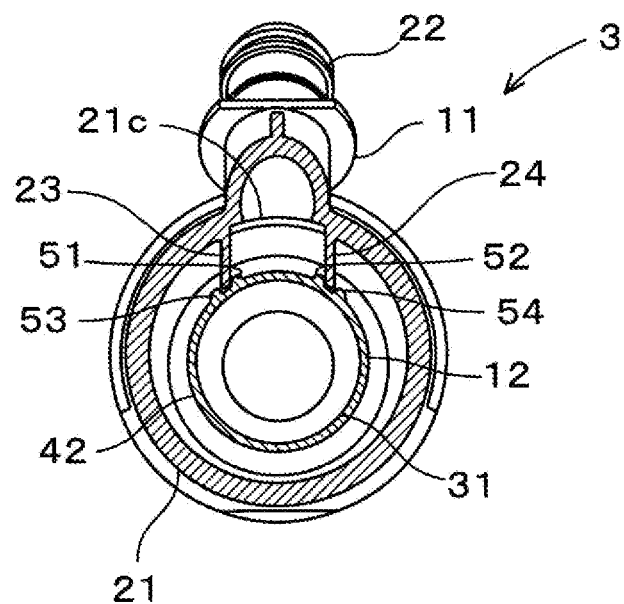
FIG. 6 is a radial cross-sectional view of the refueling port, and is a cross-sectional view along VI-VI of FIG. 4.
Figure 7:
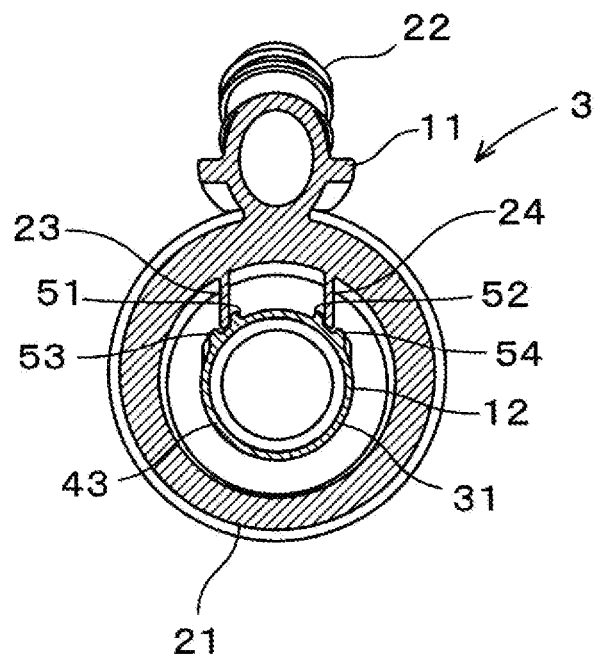
FIG. 7 is a radial cross-sectional view of the refueling port, and is a cross-sectional view along VII-VII of FIG. 4.
Figure 8:
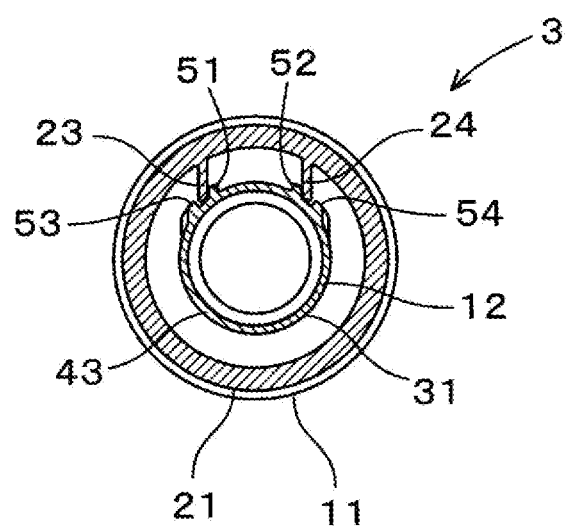
FIG. 8 is a radial cross-sectional view of the refueling port, and is a cross-sectional view along VIII-VIII of FIG. 4.
Figure 9:
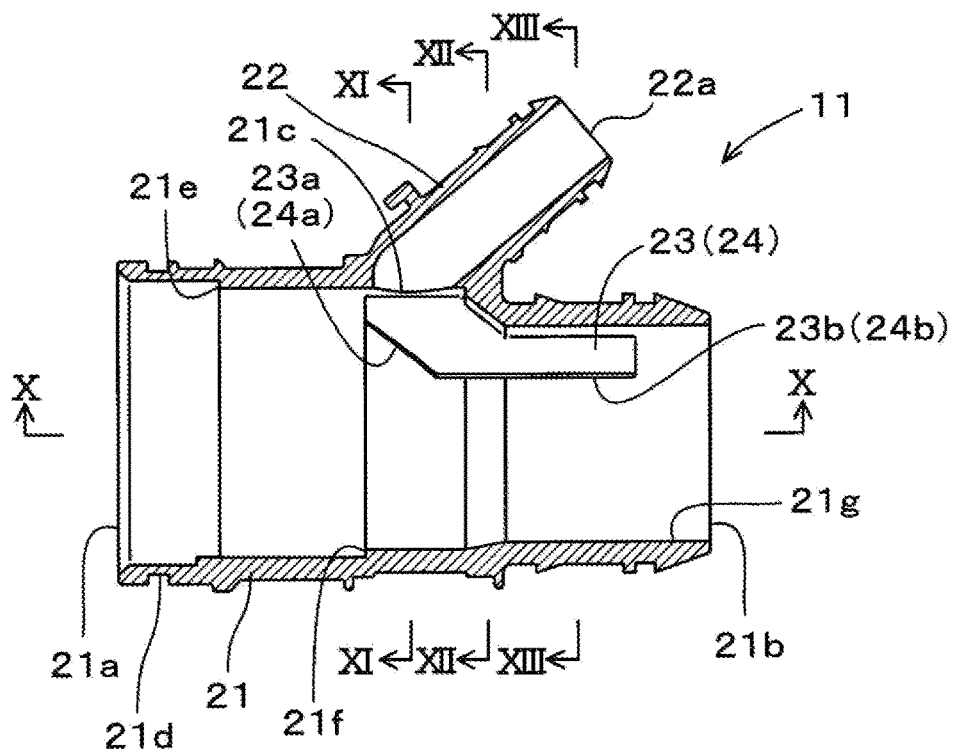
FIG. 9 is an axial cross-sectional view of a refueling port body constituting the refueling port according to the first embodiment.
Figure 10:
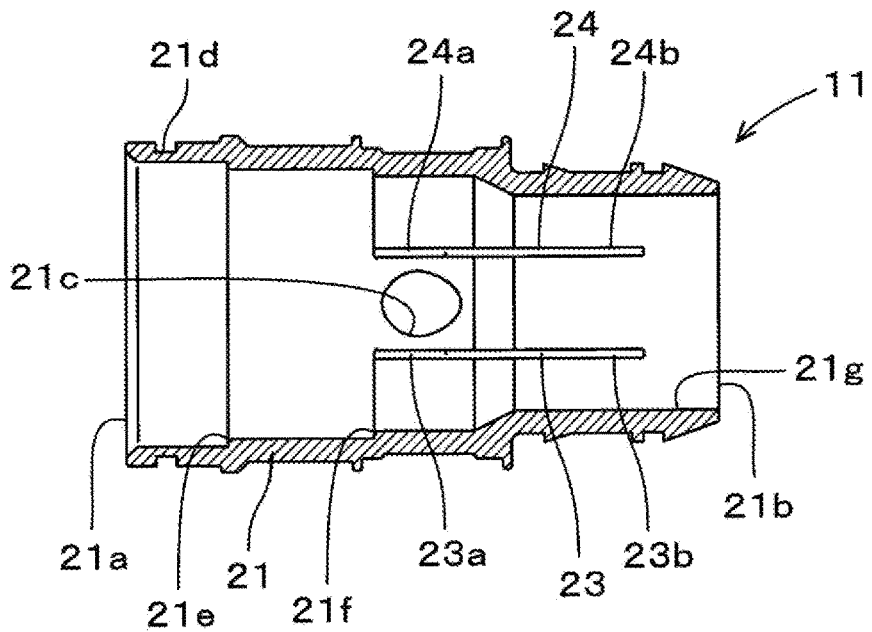
FIG. 10 is an axial cross-sectional view of the refueling port body, and is a cross-sectional view along X-X of FIG. 9.
Figure 11:
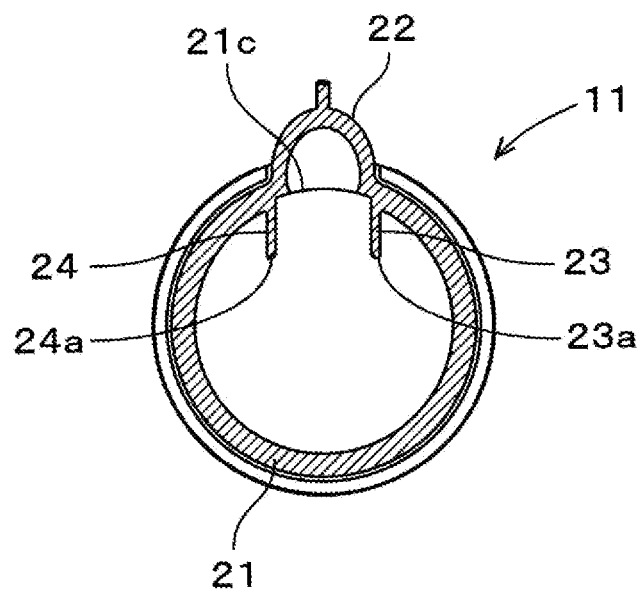
FIG. 11 is a radial cross-sectional view of the refueling port body, and is a cross-sectional view along XI-XI of FIG. 9.
Figure 12:
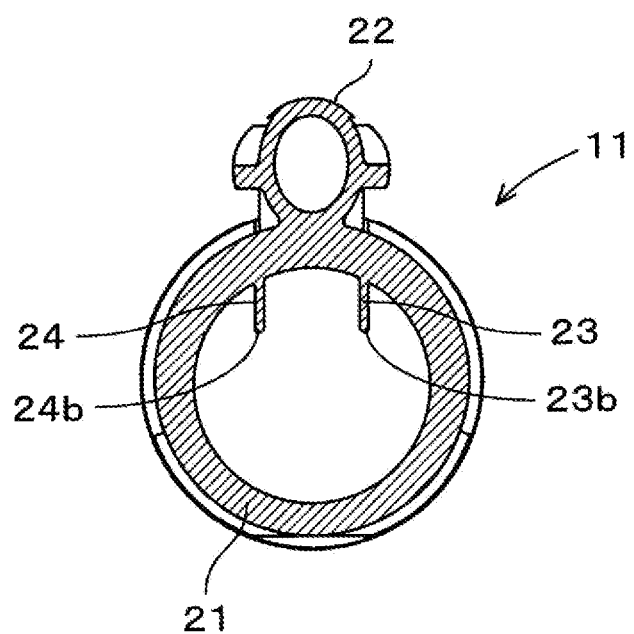
FIG. 12 is a radial cross-sectional view of the refueling port body, and is a cross-sectional view along XII-XII of FIG. 9.
Figure 13:
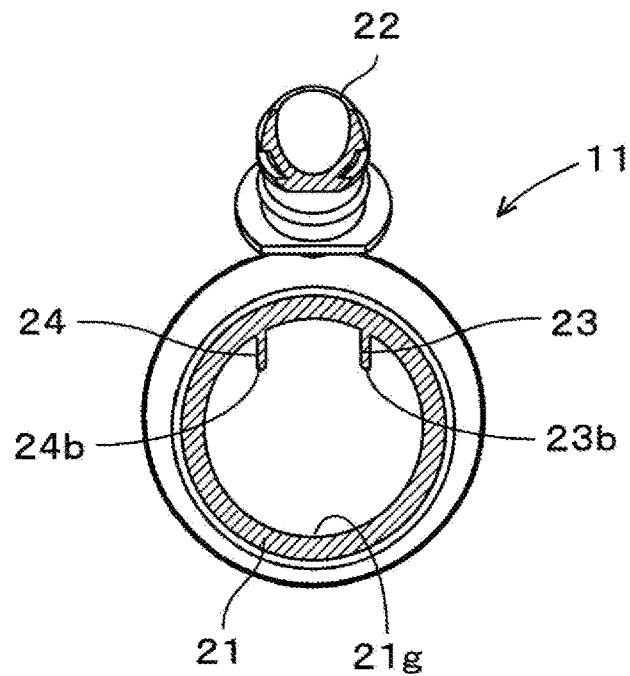
FIG. 13 is a radial cross-sectional view of the refueling port body, and is a cross-sectional view along XIII-XIII of FIG. 9.
Figure 14:
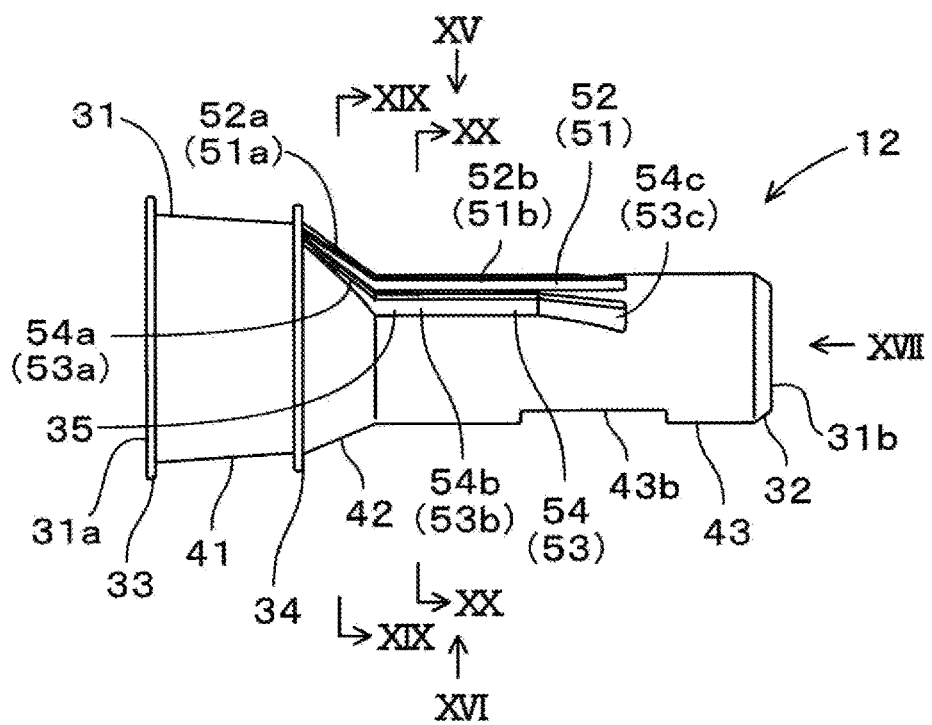
FIG. 14 is a side view of a nozzle guide constituting the refueling port according to the first embodiment.
Figure 15:
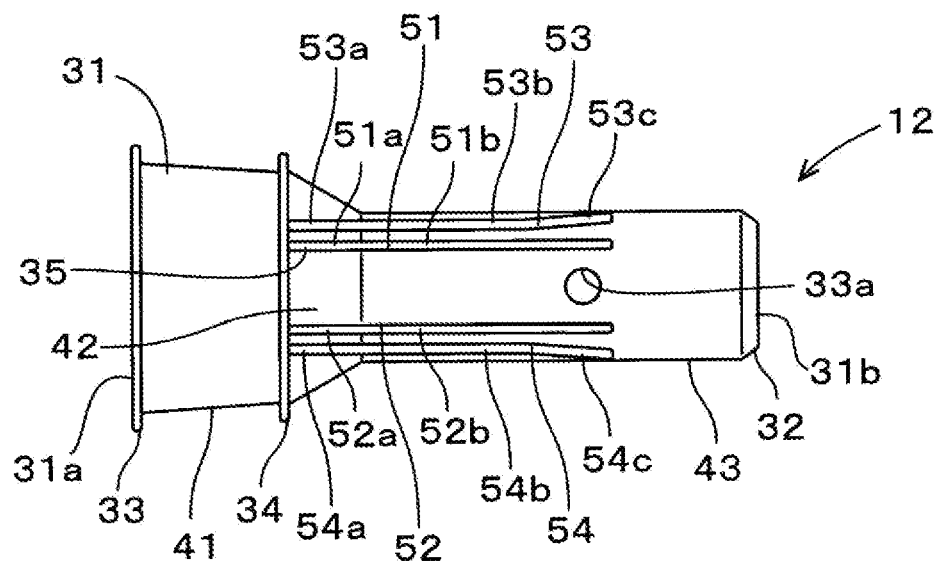
FIG. 15 is a view of the nozzle guide of FIG. 14 as viewed from the direction XV (upper side of FIG. 14).
Figure 16:
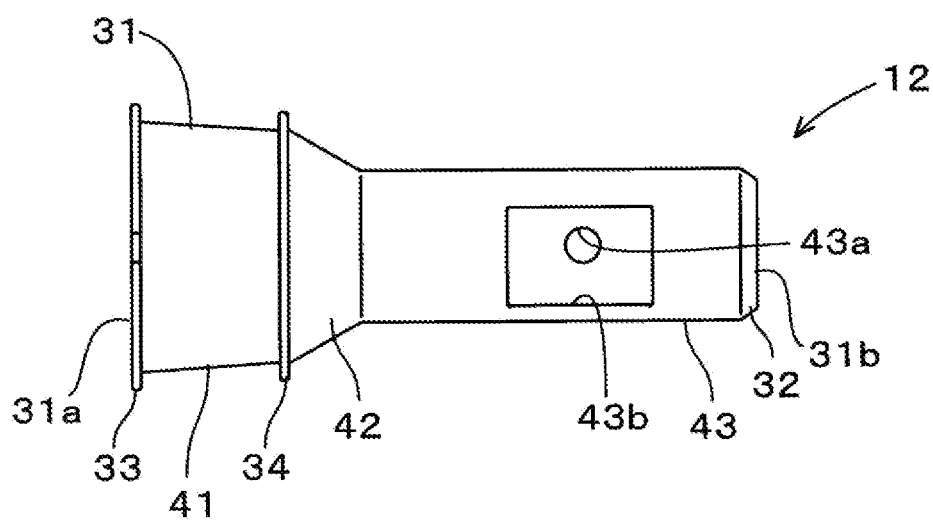
FIG. 16 is a view of the nozzle guide of FIG. 14 as viewed from the direction XVI (lower side of FIG. 14).
Figure 17:
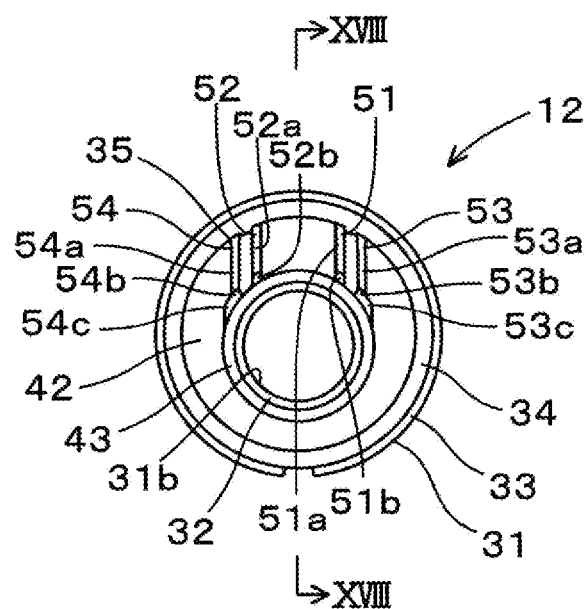
FIG. 17 is a view of the nozzle guide as viewed from the side opposite to the nozzle insertion port, and is a view as viewed from the direction XVII of FIG. 14 (right side of FIG. 14).
Figure 18:
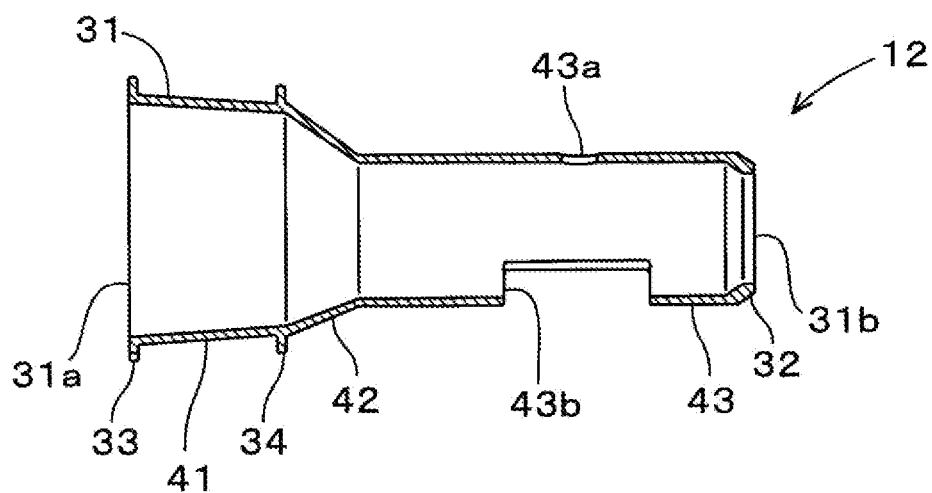
FIG. 18 is an axial cross-sectional view of the nozzle guide, and is a cross-sectional view along XVIII-XVIII of FIG. 17.
Figure 19:
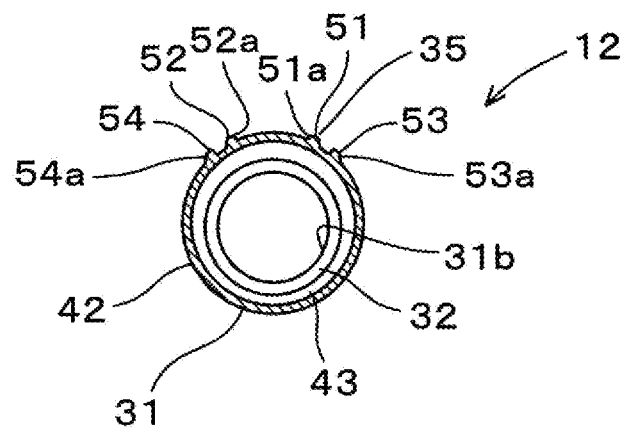
FIG. 19 is a radial cross-sectional view of the nozzle guide, and is a cross-sectional view along XIX-XIX of FIG. 14.
Figure 20:
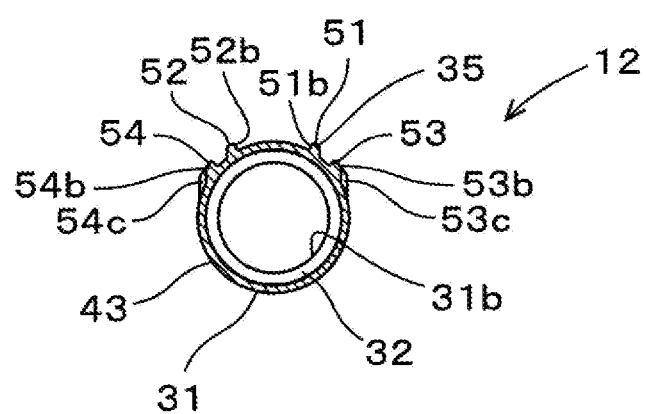
FIG. 20 is a radial cross-sectional view of the nozzle guide, and is a cross-sectional view along XX-XX of FIG. 14.
Figure 21:
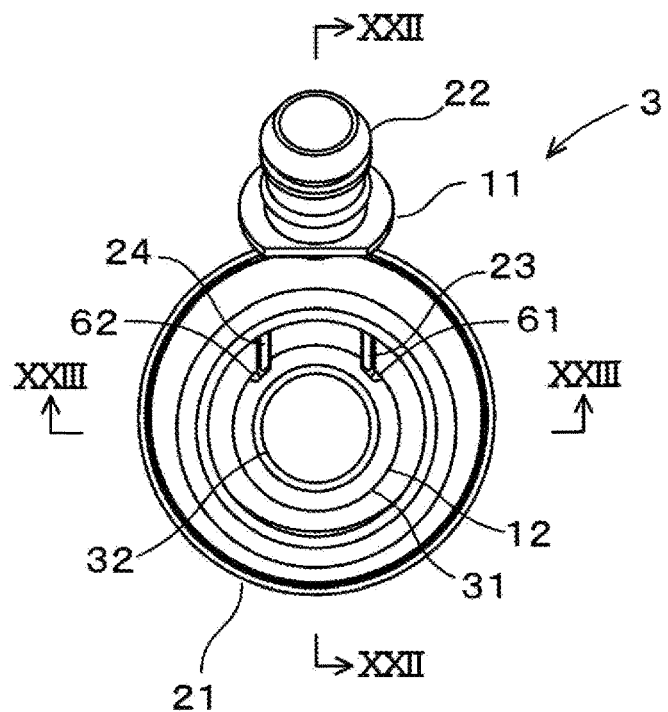
FIG. 21 is a view of a refueling port according to the second embodiment as viewed from the side opposite to a nozzle insertion port.
Figure 22:
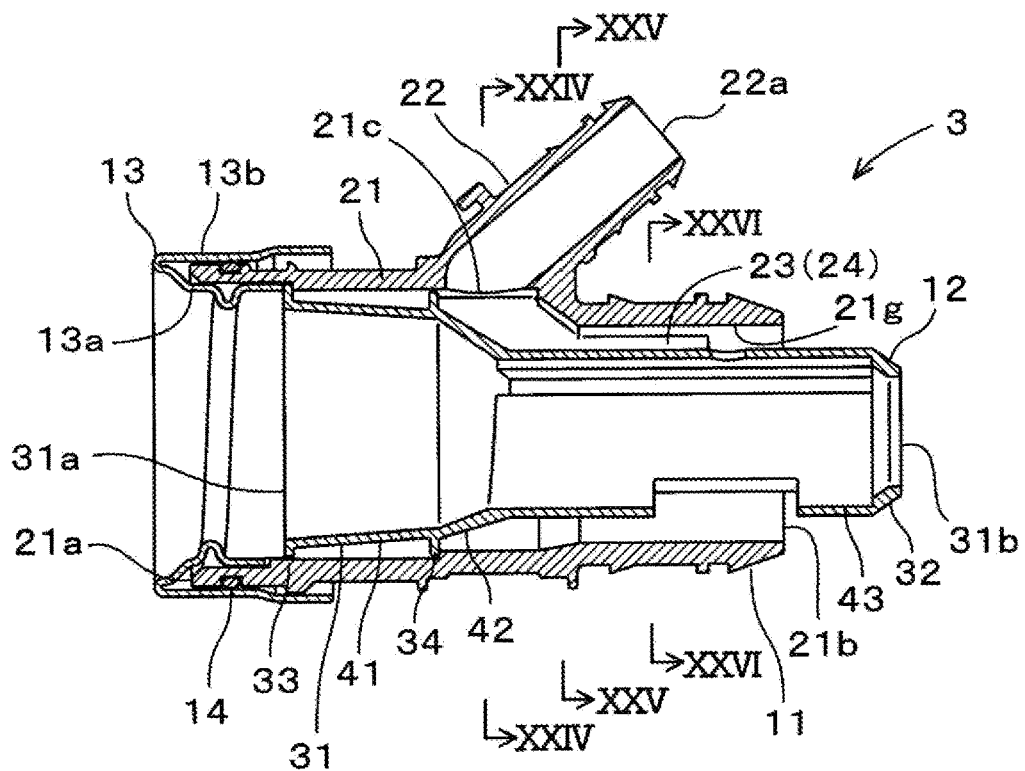
FIG. 22 is an axial cross-sectional view of the refueling port, and is a cross-sectional view along XXII-XXII of FIG. 21.
Figure 23:
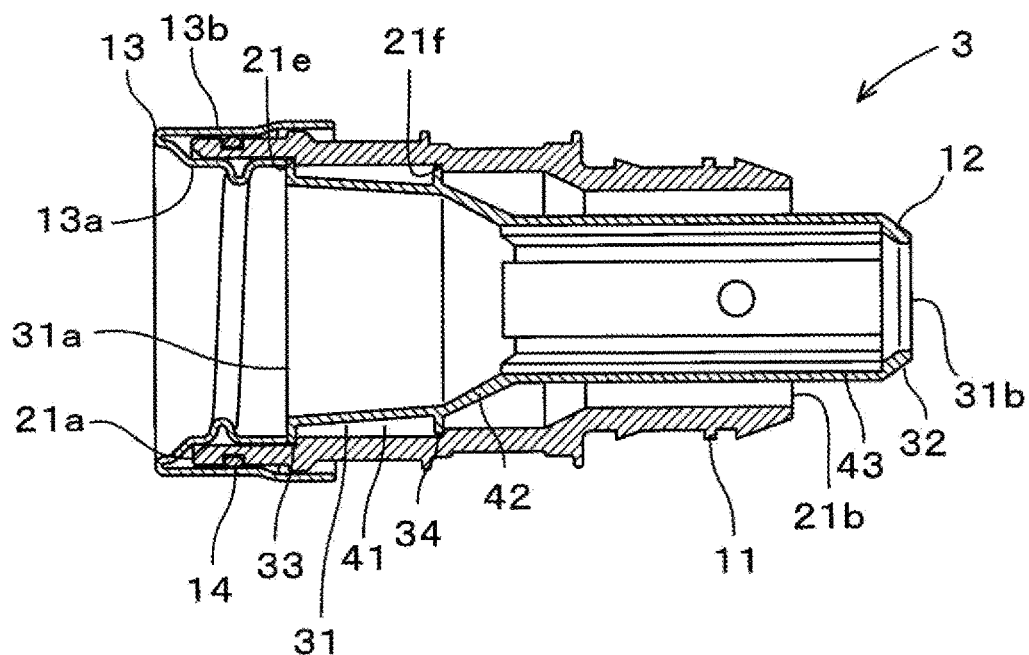
FIG. 23 is an axial cross-sectional view of the refueling port, and is a cross-sectional view along XXIII-XXIII of FIG. 21.
Figure 24:
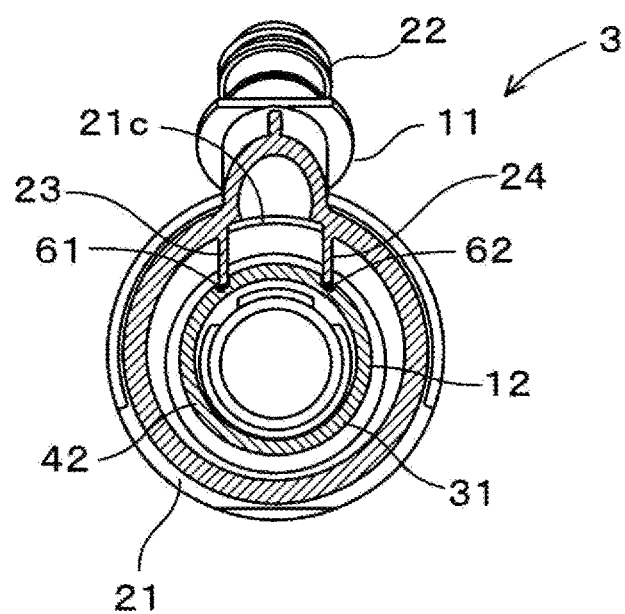
FIG. 24 is a radial cross-sectional view of the refueling port, and is a cross-sectional view along XXIV-XXIV of FIG. 22.
Figure 25:
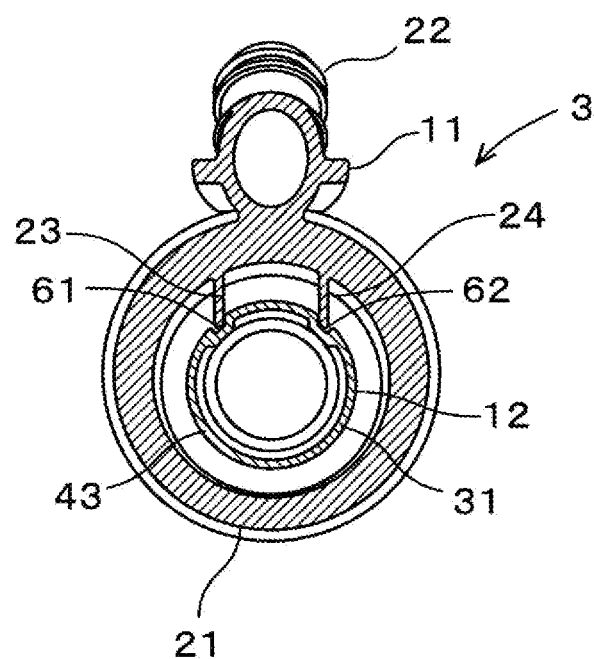
FIG. 25 is a radial cross-sectional view of the refueling port, and is a cross-sectional view along XXV-XXV of FIG. 22.
Figure 26:
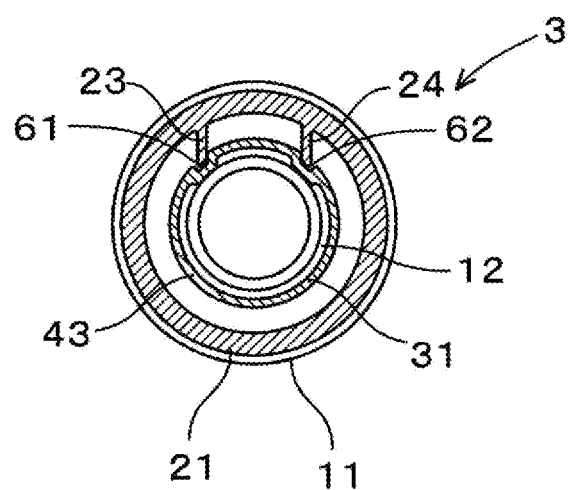
FIG. 26 is a radial cross-sectional view of the refueling port, and is a cross-sectional view along XXVI-XXVI of FIG. 22.
Figure 27:
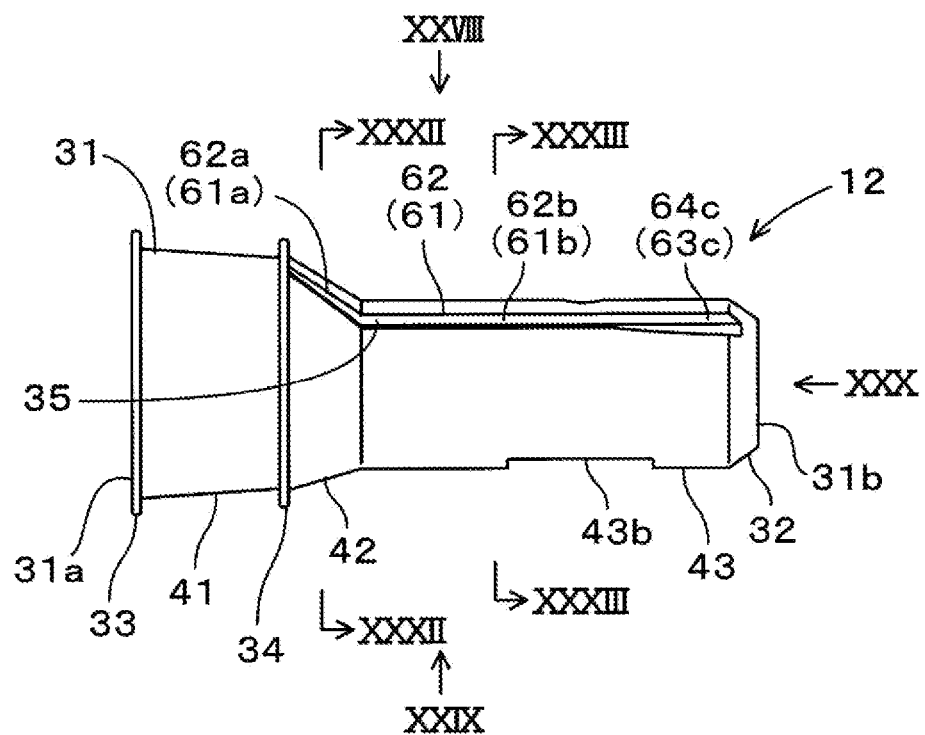
FIG. 27 is a side view of a nozzle guide constituting the refueling port according to the second embodiment.
Figure 28:
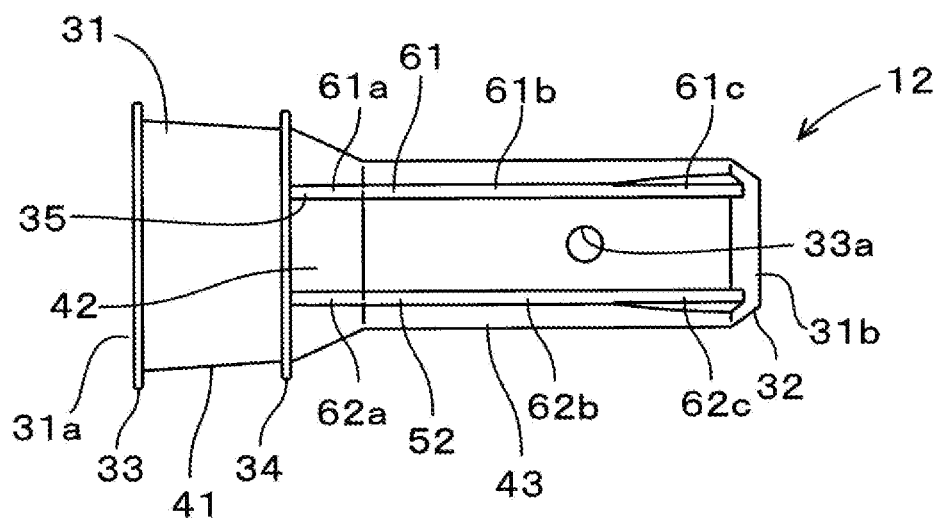
FIG. 28 is a view of the nozzle guide of FIG. 27 as viewed from the direction XXVIII (upper side of FIG. 27).
Figure 29:
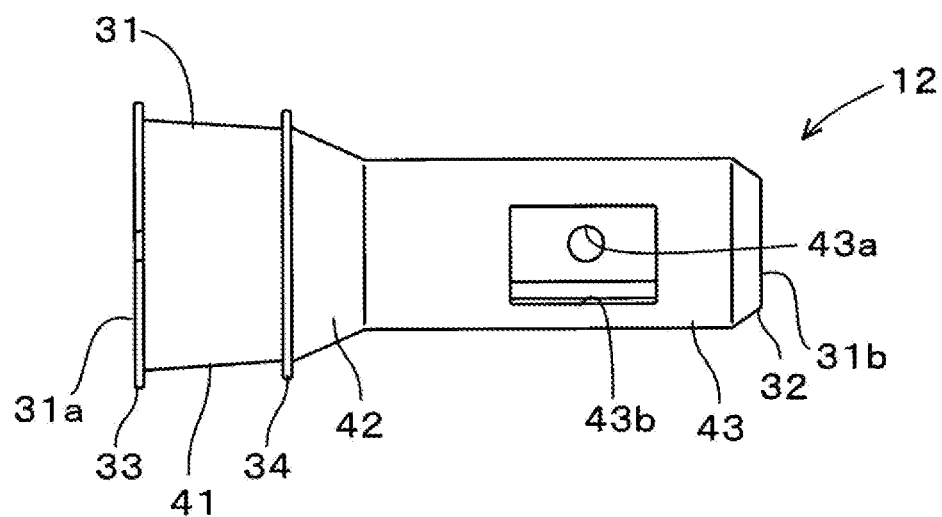
FIG. 29 is a view of the nozzle guide of FIG. 27 as viewed from the direction XXIX (lower side of FIG. 27).
Figure 30:
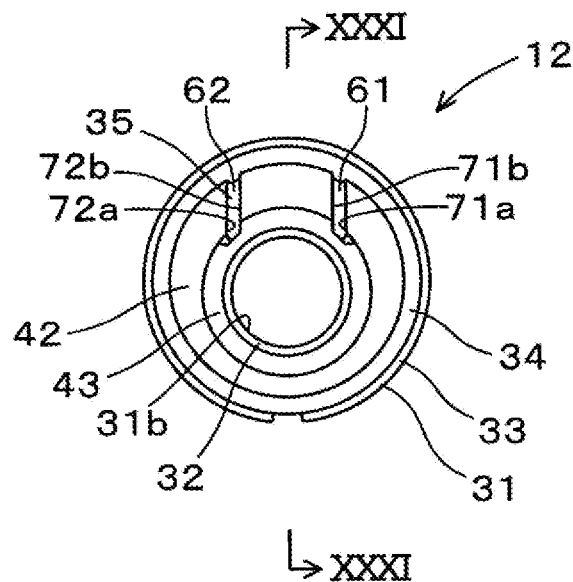
FIG. 30 is a view of the nozzle guide as viewed from the side opposite to the nozzle insertion port, and is a view as viewed from the direction XXX of FIG. 27 (right side of FIG. 27).
Figure 31:
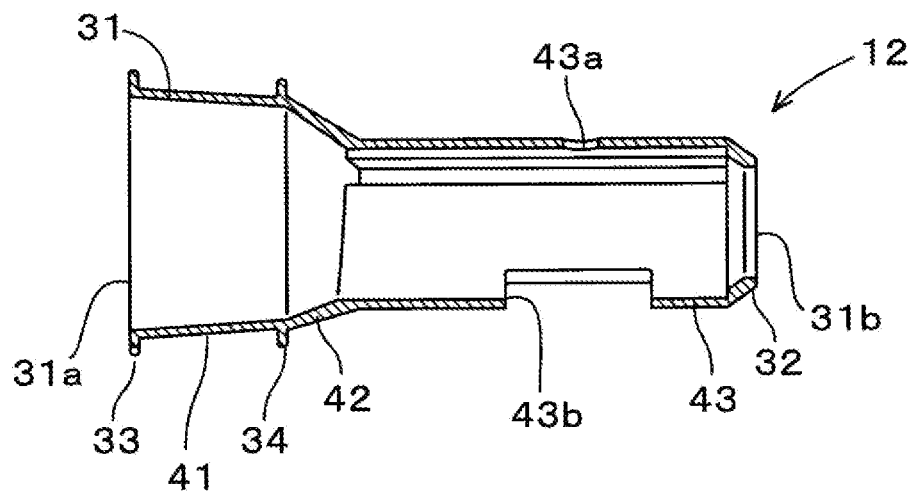
FIG. 31 is an axial cross-sectional view of the nozzle guide, and is a cross-sectional view along XXXI-XXXI of FIG. 30.
Figure 32:
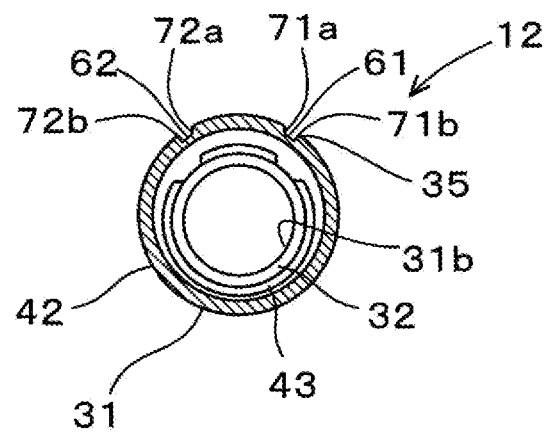
FIG. 32 is a radial cross-sectional view of the nozzle guide, and is a cross-sectional view along XXXII-XXXII of FIG. 27.
Figure 33:
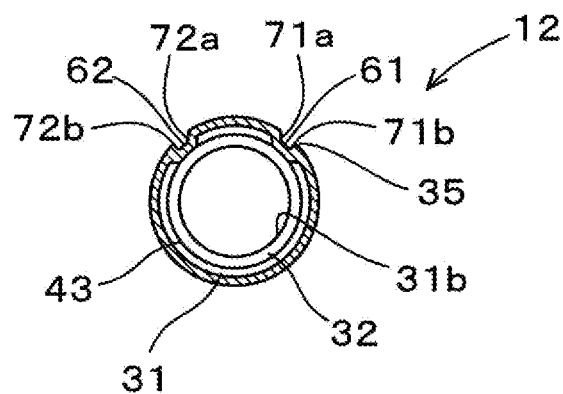
FIG. 33 is a radial cross-sectional view of the nozzle guide, and is a cross-sectional view along XXXIII-XXXIII of FIG. 27.

As shown in FIG. 4 and FIG. 5, the nozzle guide 12 is molded of resin and formed in a cylindrical shape. The nozzle guide 12 is inserted from the nozzle insertion port 21a of the refueling port body 11 and is arranged inside the refueling port body 11. The nozzle guide 12 is a member for guiding the nozzle 2a of the refueling gun 2. Specifically, the nozzle guide 12 has a function of guiding the nozzle 2a to be positioned at a predetermined position when the nozzle 2a of the refueling gun 2 is inserted, and a function of positioning the completely inserted nozzle 2a at the predetermined position in a predetermined posture.

In this embodiment, the tip of the nozzle guide 12 protrudes outward with respect to the filler pipe connection port 21b of the refueling port body 11. However, the entire nozzle guide 12 may be arranged inside the refueling port body 11. In this case, the tip of the nozzle guide 12 is positioned on the inner side with respect to the filler pipe connection port 21b of the refueling port body 11.

As shown in FIG. 4 and FIG. 5, the inlet metal fitting 13 is molded of metal and formed in a cylindrical shape. In this embodiment, the inlet metal fitting 13 is formed in a folded cylindrical shape. That is, the inlet metal fitting 13 is formed in a U shape in the axial cross section. In other words, the inlet metal fitting 13 includes an inner cylinder portion 13a and an outer cylinder portion 13b.

The inlet metal fitting 13 is mounted on the side of the nozzle insertion port 21a of the refueling port body 11. In this embodiment, a portion of the nozzle insertion port 21a of the refueling port body 11 is inserted into the U-shaped opposed space of the inlet metal fitting 13. Then, the outer cylinder portion 13b of the inlet metal fitting 13 is locked to the refueling port body 11 by, for example, caulking. On the other hand, the inner cylinder portion 13a of the inlet metal fitting 13 is in contact with the nozzle guide 12 and positions the nozzle guide 12. Further, a female screw is formed on the inner cylinder portion 13a of the inlet metal fitting 13, and a refueling cap (not shown) is screwed into the inner cylinder portion 13a.

The sealing member 14 is arranged in a state to be sandwiched between the outer peripheral surface of the refueling port body 11 on the side of the nozzle insertion port 21a and the inner peripheral surface of the outer cylinder portion 13b of the inlet metal fitting 13. For example, an O-ring or the like is used as the sealing member 14 and seals between the inner region and the outer region of the refueling port body 11.

(2-2. Detailed Configuration of the Refueling Port Body 11)

The detailed configuration of the refueling port body 11 will be described with reference to FIG. 9 to FIG. 13. The refueling port body 11 includes a body cylinder portion 21, a breather cylinder portion 22, and a pair of guide ribs 23 and 24.

The body cylinder portion 21 is formed in a cylindrical shape and has a straight central axis. The body cylinder portion 21 includes the nozzle insertion port 21a which is located at one end (left end of FIG. 9) and into which the nozzle 2a can be inserted. The body cylinder portion 21 includes the filler pipe connection port 21b which is located at the other end (right end of FIG. 9) and connected to the filler pipe 5. In other words, the filler pipe connection port 21b is located at the end on the side opposite to the nozzle insertion port 21a. The filler pipe 5 is fitted on the outer peripheral surface of the body cylinder portion 21 on the side of the filler pipe connection port 21b. Therefore, the outer peripheral surface of the body cylinder portion 21 on the side of the filler pipe connection port 21b is formed in an uneven shape in the axial direction and is locked to the filler pipe 5.

The body cylinder portion 21 includes a reflux port 21c which is formed on the peripheral surface for flowing in the fuel vapor recirculated via the breather pipe 6. The reflux port 21c is located in the middle of the body cylinder portion 21 in the axial direction and is formed in a circular shape, for example.

An annular groove 21d is formed on the outer peripheral surface of the body cylinder portion 21 on the side of the nozzle insertion port 21a. The sealing member 14 (shown in FIG. 4 and FIG. 5) is arranged in the annular groove 21d. The inner peripheral surface of the body cylinder portion 21 is reduced in diameter in a stepped shape from the nozzle insertion port 21a toward the filler pipe connection port 21b. Accordingly, stepped surfaces 21e and 21f having a normal on the side of the nozzle insertion port 21a are formed on the inner peripheral surface of the body cylinder portion 21. The stepped surfaces 21e and 21f are located on the side of the nozzle insertion port 21a with respect to the reflux port 21c.

An inner peripheral surface 21g of the body cylinder portion 21 on the side of the filler pipe connection port 21b has a cylindrical inner peripheral surface shape and is formed to have the smallest diameter in the body cylinder portion 21. In this embodiment, the inner peripheral surface 21g is formed to have a diameter smaller than the inner diameter of the portion where the reflux port 21c is formed. Therefore, when the operator looks at the inside of the body cylinder portion 21 from the side of the filler pipe connection port 21b of the body cylinder portion 21, the operator cannot visually recognize the portion of the reflux port 21c. Further, when the operator looks at the inside of the body cylinder portion 21 from the side of the filler pipe connection port 21b of the body cylinder portion 21, the operator cannot visually recognize the stepped surfaces 21e and 21f, either.

On the other hand, the inner peripheral surface of the body cylinder portion 21 on the side of the nozzle insertion port 21a is formed to have a diameter larger than the inner diameter of the portion where the reflux port 21c is formed. Therefore, when the operator looks at the inside of the body cylinder portion 21 from the side of the nozzle insertion port 21a of the body cylinder portion 21, the operator can visually recognize the portion of the reflux port 21c. Further, the operator can visually recognize the stepped surfaces 21e and 21f from the side of the nozzle insertion port 21a.

The breather cylinder portion 22 is formed in a cylindrical shape, and one end thereof is connected to the peripheral edge of the reflux port 21c of the body cylinder portion 21. In this embodiment, the breather cylinder portion 22 is formed in a cylindrical shape that has a straight central axis. However, the breather cylinder portion 22 may be formed in an L-shaped cylindrical shape, for example. Further, in this embodiment, the breather cylinder portion 22 is connected to the body cylinder portion 21 so that the axial direction of the breather cylinder portion 22 is inclined with respect to the axial direction of the body cylinder portion 21.

The breather cylinder portion 22 includes a breather pipe connection port 22a connected to the breather pipe 6 on the side opposite to the reflux port 21c. The breather pipe 6 is fitted on the outer peripheral surface of the breather cylinder portion 22 on the side of the breather pipe connection port 22a. Therefore, the outer peripheral surface of the breather cylinder portion 22 on the side of the breather pipe connection port 22a is formed in an uneven shape in the axial direction and is locked to the breather pipe 6.

The pair of guide ribs 23 and 24 protrude inward in the radial direction from the inner peripheral surface of the body cylinder portion 21. The pair of guide ribs 23 and 24 are respectively formed in a plate shape and are formed to extend in parallel to the axial direction of the body cylinder portion 21. The pair of guide ribs 23 and 24 are formed to sandwich the reflux port 21c in the circumferential direction and guide the fuel vapor flowing in from the reflux port 21c in the direction toward the filler pipe connection port 21b. In this embodiment, the pair of guide ribs 23 and 24 are formed in the same shape, and the opposing surfaces of the pair of guide ribs 23 and 24 are arranged to be parallel to each other.

The pair of guide ribs 23 and 24 are arranged to extend from the position of the reflux port 21c toward the side of the filler pipe connection port 21b in the body cylinder portion 21. The ends of the pair of guide ribs 23 and 24 on the side of the nozzle insertion port 21a coincide with the stepped surface 21f of the body cylinder portion 21.

The ends of the pair of guide ribs 23 and 24 on the side of the filler pipe connection port 21b are located inside in the axial direction with respect to the filler pipe connection port 21b. In other words, the ends of the pair of guide ribs 23 and 24 are located between the reflux port 21c and the filler pipe connection port 21b. However, the ends of the pair of guide ribs 23 and 24 may be located at the same position as the filler pipe connection port 21b, or may be located outside in the axial direction with respect to the filler pipe connection port 21b.

In the pair of guide ribs 23 and 24, the tip surfaces 23a and 24a on the inner side in the radial direction near the reflux port 21c are inclined with respect to the axial direction and are located on the outermost side in the radial direction on the side of the nozzle insertion port 21a. On the other hand, in the pair of guide ribs 23 and 24, the tip surfaces 23b and 24b on the inner side in the radial direction on the side of the filler pipe connection port 21b are formed to be parallel to the axial direction.

(2-3. Detailed Configuration of the Nozzle Guide 12)

The detailed configuration of the nozzle guide 12 will be described with reference to FIG. 14 to FIG. 20. The nozzle guide 12 includes a guide cylinder portion 31, a nozzle stopper 32, a positioning protrusion 33, a backflow suppression portion 34, and a locking portion 35. In the following description, the left side of FIG. 14 corresponds to the side of the nozzle insertion port 21a, and the right side of FIG. 14 corresponds to the side opposite to the nozzle insertion port 21a.

The guide cylinder portion 31 is formed in a cylindrical shape that has a straight central axis. The guide cylinder portion 31 has an inlet opening 31a at one end and an outlet opening 31b at the other end. The inlet opening 31a is located on the side of the nozzle insertion port 21a of the refueling port body 11, and the outlet opening 31b is located on the side opposite to the nozzle insertion port 21a.

The guide cylinder portion 31 includes a first cylinder portion 41, a second cylinder portion 42, and a third cylinder portion 43. The first cylinder portion 41 is formed in a cylindrical shape and has the inlet opening 31a of the guide cylinder portion 31 at one end. The first cylinder portion 41 is formed in a tapered cylindrical shape that has a slight angle with the inlet opening 31a as the maximum diameter. The second cylinder portion 42 is formed in a cylindrical shape and is continuously connected to the downstream end of the first cylinder portion 41. The second cylinder portion 42 is formed in a tapered cylindrical shape that has the maximum diameter on the side of the first cylinder portion 41 and has a larger taper angle than the first cylinder portion 41.

The third cylinder portion 43 is formed in a cylindrical shape and is continuously connected to the downstream end of the second cylinder portion 42. The third cylinder portion 43 is formed in a cylindrical shape. A circular hole 43a that communicates the inner side in the radial direction and the outer side in the radial direction is formed in the axial middle portion of the third cylinder portion 43. Further, in the axial middle portion of the third cylinder portion 43, a hole 43b larger than the circular hole 43a is formed on the opposite side in the circumferential direction with respect to the circular hole 43a.

The nozzle stopper 32 protrudes inward in the radial direction from the end of the guide cylinder portion 31 on the side opposite to the inlet opening 31a, that is, the downstream end of the third cylinder portion 43. The nozzle stopper 32 forms the outlet opening 31b of the guide cylinder portion 31. The nozzle stopper 32 can come into contact with the tip of the nozzle 2a of the refueling gun 2, and positions the nozzle 2a by contacting the nozzle 2a.

The positioning protrusion 33 protrudes outward in the radial direction from the outer peripheral surface of the guide cylinder portion 31 on the side of the inlet opening 31a, that is, the outer peripheral surface at the upstream end of the first cylinder portion 41. The positioning protrusion 33 is formed to extend in the circumferential direction. In particular, the positioning protrusion 33 is formed over the entire circumference in the circumferential direction.

The backflow suppression portion 34 protrudes outward in the radial direction from the outer peripheral surface of the middle portion of the guide cylinder portion 31, specifically, the outer peripheral surface at the boundary between the first cylinder portion 41 and the second cylinder portion 42. The backflow suppression portion 34 is formed to extend in the circumferential direction. In particular, the backflow suppression portion 34 is formed over the entire circumference in the circumferential direction.

The locking portion 35 is locking ribs that protrude outward in the radial direction from the outer peripheral surface of the guide cylinder portion 31 and extend in the axial direction of the guide cylinder portion 31. In this embodiment, the locking portion 35 serving as the locking ribs includes a pair of inner locking ribs 51 and 52 and a pair of outer locking ribs 53 and 54.

The pair of inner locking ribs 51 and 52 are formed to sandwich the circular hole 43a of the third cylinder portion 43 in the circumferential direction. Assuming that the third cylinder portion 43 does not exist, the pair of inner locking ribs 51 and 52 face each other. Further, the pair of inner locking ribs 51 and 52 are formed to be parallel to the axial direction of the guide cylinder portion 31 over the entire length. In other words, the pair of inner locking ribs 51 and 52 are arranged in parallel to each other over the entire length.

The pair of inner locking ribs 51 and 52 are formed in a range from the upstream end of the second cylinder portion 42 to the axial middle portion of the third cylinder portion 43. In other words, the upstream ends of the pair of inner locking ribs 51 and 52 are connected to the backflow suppression portion 34.

The protruding heights of the pair of inner locking ribs 51 and 52 are substantially the same over the entire length. Further, the protruding heights of the pair of inner locking ribs 51 and 52 are sufficiently smaller than the maximum height of the gradient of the second cylinder portion 42. In other words, in the pair of inner locking ribs 51 and 52, the tip surfaces of the portions 51a and 52a in the protruding direction located on the outer peripheral surface of the second cylinder portion 42 are inclined along the inclination of the second cylinder portion 42. In the pair of inner locking ribs 51 and 52, the tip surfaces of the portions 51b and 52b in the protruding direction located on the outer peripheral surface of the third cylinder portion 43 are parallel to the axial direction of the third cylinder portion 43. Further, the protruding heights of the pair of inner locking ribs 51 and 52 are formed to be lower than the protruding heights of the pair of guide ribs 23 and 24.

In the pair of inner locking ribs 51 and 52, the separation distance between the back surfaces of the surfaces facing each other is about the same as the separation distance between the opposing surfaces of the pair of guide ribs 23 and 24 of the refueling port body 11. Specifically, the separation distance between the back surfaces of the pair of inner locking ribs 51 and 52 is slightly shorter than the separation distance between the opposing surfaces of the pair of guide ribs 23 and 24.

Like the pair of inner locking ribs 51 and 52, the pair of outer locking ribs 53 and 54 are formed to sandwich the circular hole 43a of the third cylinder portion 43 in the circumferential direction. Further, like the pair of inner locking ribs 51 and 52, the pair of outer locking ribs 53 and 54 are formed in a range from the upstream end of the second cylinder portion 42 to the axial middle portion of the third cylinder portion 43. In other words, the upstream ends of the pair of outer locking ribs 53 and 54 are connected to the backflow suppression portion 34. In addition, the pair of outer locking ribs 53 and 54 have the same length as the pair of inner locking ribs 51 and 52.

The protruding heights of the pair of outer locking ribs 53 and 54 are substantially the same over the entire length. In this embodiment, the protruding heights of the pair of outer locking ribs 53 and 54 are about the same as the protruding heights of the pair of inner locking ribs 51 and 52.

Therefore, in the pair of outer locking ribs 53 and 54, the tip surfaces of the portions 53a and 54a in the protruding direction located on the outer peripheral surface of the second cylinder portion 42 are inclined along the inclination of the second cylinder portion 42. In the pair of outer locking ribs 53 and 54, the tip surfaces of the portions 53b, 53c, 54b, and 54c in the protruding direction located on the outer peripheral surface of the third cylinder portion 43 are parallel to the axial direction of the third cylinder portion 43. Further, the protruding heights of the pair of outer locking ribs 53 and 54 are formed to be lower than the protruding heights of the pair of guide ribs 23 and 24.

Here, in the pair of outer locking ribs 53 and 54, the portions 53b and 54b located on the upstream side of the outer peripheral surface of the third cylinder portion 43 are formed to be parallel to the axial direction of the third cylinder portion 43 (the axial direction of the guide cylinder portion 31). On the other hand, in the pair of outer locking ribs 53 and 54, the portions 53c and 54c located on the downstream side of the outer peripheral surface of the third cylinder portion 43 are inclined with respect to the axial direction of the third cylinder portion 43 (the axial direction of the guide cylinder portion 31). Specifically, the portions 53c and 54c form tapered portions that are inclined in a direction away from the pair of inner locking ribs 51 and 52 toward the side of the outlet opening 31b.

In the pair of outer locking ribs 53 and 54, the separation distance between the surfaces facing each other is about the same as the separation distance between the back surfaces of the surfaces where the pair of guide ribs 23 and 24 of the refueling port body 11 face each other. Specifically, the separation distance between the opposing surfaces of the pair of outer locking ribs 53 and 54 is slightly longer than the separation distance between the back surfaces of the pair of guide ribs 23 and 24.

The separation distance between the inner locking rib 51 and the portions 53a and 53b of the outer locking rib 53 is substantially equal to the thickness of the guide rib 23. On the other hand, the separation distance between the inner locking rib 51 and the portion 53c of the outer locking rib 53 is larger than the thickness of the guide rib 23. Further, the separation distance between the inner locking rib 52 and the portions 54a and 54b of the outer locking rib 54 is substantially equal to the thickness of the guide rib 24. On the other hand, the separation distance between the inner locking rib 52 and the portion 54c of the outer locking rib 54 is larger than the thickness of the guide rib 24.

(2-4. Assembling Method and Assembled State of the Refueling Port Body 11 and the Nozzle Guide 12)

A method of assembling the refueling port body 11 and the nozzle guide 12 and the assembled state thereof will be described with reference to FIG. 3 to FIG. 8.

The nozzle guide 12 is inserted from the side of the nozzle insertion port 21a of the body cylinder portion 21 of the refueling port body 11. The nozzle guide 12 is inserted into the body cylinder portion 21 of the refueling port body 11 from the side of the third cylinder portion 43 of the guide cylinder portion 31. At this time, when the body cylinder portion 21 of the refueling port body 11 is viewed from the axial direction, the positions of the pair of guide ribs 23 and 24 of the refueling port body 11 and the locking portion 35 of the nozzle guide 12 are matched. Specifically, the guide rib 23 is located between the inner locking rib 51 and the outer locking rib 53, and the guide rib 24 is located between the inner locking rib 52 and the outer locking rib 54.

Here, in the body cylinder portion 21 of the refueling port body 11, the tips of the pair of guide ribs 23 and 24 in the protruding direction are located on the inner side in the radial direction with respect to the inner peripheral surface 21g on the side of the filler pipe connection port 21b. Therefore, the operator can visually recognize the tips of the pair of guide ribs 23 and 24 in the protruding direction from the side of the filler pipe connection port 21b.

Further, in the nozzle guide 12, the tips of the pair of inner locking ribs 51 and 52 and the pair of outer locking ribs 53 and 54 in the protruding direction are located on the outer side in the radial direction with respect to the outer peripheral surface of the third cylinder portion 43 of the guide cylinder portion 31. Therefore, the operator can visually recognize the tips of the pair of inner locking ribs 51 and 52 in the protruding direction and the tips of the pair of outer locking ribs 53 and 54 in the protruding direction from the side of the outlet opening 31b.

Accordingly, the locking positions of the pair of guide ribs 23 and 24 and the pair of inner locking ribs 51 and 52 are located on the inner side in the radial direction with respect to the inner peripheral surface of the filler pipe connection port 21b of the body cylinder portion 21, and located on the outer side in the radial direction with respect to the outer peripheral surface of the end opposite to the nozzle insertion port 21a in the guide cylinder portion 31 of the nozzle guide 12. Therefore, the locking position is provided at a position that can be visually recognized from the side of the filler pipe connection port 21b.

In addition, the locking positions of the pair of guide ribs 23 and 24 and the pair of outer locking ribs 53 and 54 are similarly located on the inner side in the radial direction with respect to the inner peripheral surface of the filler pipe connection port 21b of the body cylinder portion 21, and located on the outer side in the radial direction with respect to the outer peripheral surface of the end opposite to the nozzle insertion port 21a in the guide cylinder portion 31 of the nozzle guide 12. Therefore, the locking position is provided at a position that can be visually recognized from the side of the filler pipe connection port 21b.

Accordingly, when looking from the side of the filler pipe connection port 21b of the body cylinder portion 21, the operator can make the positions coincide with each other while visually recognizing the pair of guide ribs 23 and 24, the pair of inner locking ribs 51 and 52, and the pair of outer locking ribs 53 and 54.

Then, the operator inserts the nozzle guide 12 into the body cylinder portion 21 of the refueling port body 11 while visually recognizing the nozzle guide 12 and the body cylinder portion 21 as described above. And then, the portions of the pair of guide ribs 23 and 24 on the side of the nozzle insertion port 21a enter between the inner locking ribs 51 and 52 and the outer locking ribs 53 and 54 of the nozzle guide 12. In this embodiment, only the tips of the guide ribs 23 and 24 in the protruding direction (the inner side in the radial direction) enter between the inner locking ribs 51 and 52 and the outer locking ribs 53 and 54.

The portions 53c and 54c of the pair of outer locking ribs 53 and 54 on the side of the outlet opening 31b are formed in a tapered shape. Specifically, the portions 53c and 54c of the pair of outer locking ribs 53 and 54 are inclined in a direction away from the back surfaces of the pair of guide ribs 23 and 24 toward the side opposite to the nozzle insertion port 21a (the side of the filler pipe connection port 21b) of the body cylinder portion 21.

Therefore, the tapered portions 53c and 54c can tolerate the pair of guide ribs 23 and 24 even if the pair of guide ribs 23 and 24 are slightly displaced from the pair of inner locking ribs 51 and 52 and the pair of outer locking ribs 53 and 54. In other words, the pair of guide ribs 23 and 24 enter easily in the initial stage of entering between the pair of inner locking ribs 51 and 52 and the pair of outer locking ribs 53 and 54. The pair of guide ribs 23 and 24 are then guided toward a desired angular position by the tapered portions 53c and 54c of the outer locking ribs 53 and 54.

The pair of inner locking ribs 51 and 52 are arranged on the opposing surface side of the pair of guide ribs 23 and 24 respectively for the pair of guide ribs 23 and 24. In other words, the inner locking rib 51 is locked to the tip of the guide rib 23 in the protruding direction on one side in the circumferential direction. The inner locking rib 52 is locked to the tip of the guide rib 24 in the protruding direction on the other side in the circumferential direction.

Furthermore, the pair of outer locking ribs 53 and 54 are arranged on the back surface sides of the surfaces, where the pair of guide ribs 23 and 24 face each other, respectively for the pair of guide ribs 23 and 24. In other words, the outer locking rib 53 is locked to the tip of the guide rib 23 in the protruding direction on the other side in the circumferential direction. The outer locking rib 54 is locked to the tip of the guide rib 24 in the protruding direction on one side in the circumferential direction.

In this way, the pair of inner locking ribs 51 and 52 and the pair of outer locking ribs 53 and 54 are locked to the pair of guide ribs 23 and 24 in both directions in the circumferential direction whereby the relative rotation between the refueling port body 11 and the nozzle guide 12 is restricted.

When the operator inserts the nozzle guide 12 deeper into the body cylinder portion 21 of the refueling port body 11 while visually recognizing the nozzle guide 12 and the body cylinder portion 21 as described above, the inclined tip surfaces 23a and 24a of the pair of guide ribs 23 and 24 are in a state of approaching the second cylinder portion 42 of the nozzle guide 12. In this state, with the pair of guide ribs 23 and 24 locked to the pair of inner locking ribs 51 and 52 and the pair of outer locking ribs 53 and 54, the rotation of the nozzle guide 12 with respect to the refueling port body 11 is restricted, and the nozzle guide 12 can be positioned at an appropriate angle with respect to the refueling port body 11.

In a state where the nozzle guide 12 is completely inserted into the body cylinder portion 21 of the refueling port body 11, the backflow suppression portion 34 of the nozzle guide 12 comes into contact with the stepped surface 21f of the body cylinder portion 21. The position between the backflow suppression portion 34 and the stepped surface 21f is located on the side of the nozzle insertion port 21a with respect to the reflux port 21c. In other words, when the backflow suppression portion 34 comes into contact with the stepped surface 21f, the fuel vapor recirculated from the reflux port 21c is suppressed from flowing back to the side of the nozzle insertion port 21a.

Further, the positioning protrusion 33 of the nozzle guide 12 comes into contact with the stepped surface 21e of the body cylinder portion 21 or faces the stepped surface 21e with a slight gap. Here, as described above, the positioning protrusion 33 is sandwiched between the inlet metal fitting 13 and the stepped surface 21e of the body cylinder portion 21 by mounting the inlet metal fitting 13. In this way, the positioning protrusion 33 is sandwiched between the inlet metal fitting 13 and the stepped surface 21e whereby the nozzle guide 12 is positioned in the axial direction with respect to the refueling port body 11.

The outer peripheral surfaces of the second cylinder portion 42 and the third cylinder portion 43 of the guide cylinder portion 31 of the nozzle guide 12 are arranged to face the reflux port 21c. Moreover, a gap is formed between the outer peripheral surfaces of the second cylinder portion 42 and the third cylinder portion 43 of the guide cylinder portion 31 of the nozzle guide 12 and the inner peripheral surface of the body cylinder portion 21 on the side of the filler pipe connection port 21b with respect to the reflux port 21c.

Then, the pair of guide ribs 23 and 24 are formed between the inner peripheral surface of the body cylinder portion 21 and the outer peripheral surface of the guide cylinder portion 31 to sandwich the reflux port 21c in the circumferential direction. Further, the pair of inner locking ribs 51 and 52 and the pair of outer locking ribs 53 and 54 are formed between the inner peripheral surface of the body cylinder portion 21 and the outer peripheral surface of the guide cylinder portion 31 and are locked to the tips of the pair of guide ribs 23 and 24 in the protruding direction in both directions in the circumferential direction.

The inner peripheral surface of the body cylinder portion 21 of the refueling port body 11, the outer peripheral surface of the guide cylinder portion 31 of the nozzle guide 12, and the pair of guide ribs 23 and 24 form a guide path from the reflux port 21c of the body cylinder portion 21 of the refueling port body 11 toward the side of the filler pipe connection port 21b of the body cylinder portion 21. Therefore, the fuel vapor flowing in from the reflux port 21c of the body cylinder portion 21 of the refueling port body 11 is guided toward the side of the filler pipe connection port 21b of the refueling port body 11 by the guide path. Then, the guided fuel vapor is discharged from the refueling port body 11 to the filler pipe 5 by the circulation of the fuel supplied from the nozzle 2a of the refueling gun 2.

Furthermore, in the nozzle guide 12, the pair of inner locking ribs 51 and 52 are formed to extend in the axial direction. Therefore, the pair of inner locking ribs 51 and 52 also function as members that form the guide path. In addition, since the tips of the pair of guide ribs 23 and 24 in the protruding direction and the pair of inner locking ribs 51 and 52 are in a positional relationship of facing each other in the circumferential direction, it is possible to make it difficult for the fuel vapor circulating through the guide path to pass through the gap between the pair of guide ribs 23 and 24 and the pair of inner locking ribs 51 and 52. In other words, the fuel vapor flowing in from the reflux port 21c can be circulated to the side of the filler pipe 5.

Further, in the nozzle guide 12, the pair of outer locking ribs 53 and 54 are formed to extend in the axial direction. Therefore, if the fuel vapor passing through the gap between the tip surfaces of the pair of guide ribs 23 and 24 in the protruding direction and the outer peripheral surface of the guide cylinder portion 31 of the nozzle guide 12 does not further pass through the gap between the pair of guide ribs 23 and 24 and the pair of outer locking ribs 53 and 54, the fuel vapor cannot circulate in the circumferential direction from the guide path.

By providing the pair of outer locking ribs 53 and 54 in this way, the circulation in the circumferential direction from the guide path can be further suppressed. As a result, the fuel vapor flowing in from the reflux port 21c can be circulated to the filler pipe 5.

Also, as described above, the pair of guide ribs 23 and 24 are used to restrict the rotation of the nozzle guide 12 with respect to the refueling port body 11. In other words, the pair of guide ribs 23 and 24 have a function of restricting the rotation of the nozzle guide 12 in addition to a function of guiding the fuel vapor. Besides, the pair of guide ribs 23 and 24 have a simple structure. Therefore, the structure for restricting the rotation can be simplified as compared with a case where a dedicated structure is separately provided.

(3. Refueling Port 3 of the Second Embodiment)

The refueling port 3 according to the second embodiment will be described with reference to FIG. 21 to FIG. 33. Here, in the configuration of the refueling port 3 of the second embodiment, configurations substantially the same as those of the refueling port 3 of the first embodiment will be designated by the same reference numerals.

The refueling port 3 of the second embodiment has a different locking portion 35 of the nozzle guide 12 from the refueling port 3 of the first embodiment. The configuration of the nozzle guide 12 will be described with reference to FIG. 27 to FIG. 33. In the first embodiment, the locking portion 35 is locking ribs, whereas in the second embodiment, the locking portion 35 is locking grooves.

The nozzle guide 12 includes a pair of locking grooves 61 and 62 as the locking portion 35. Here, the locking groove 61 corresponds to a portion between the inner locking rib 51 and the outer locking rib 53 of the first embodiment, and has substantially the same function. The locking groove 62 corresponds to a portion between the inner locking rib 52 and the outer locking rib 54 of the first embodiment, and has substantially the same function.

The locking groove 61 has an inner groove side surface 71a and an outer groove side surface 71b. The inner groove side surface 71a of the locking groove 61 corresponds to the back surface of the inner locking rib 51 of the first embodiment. The outer groove side surface 71b of the locking groove 61 corresponds to the opposing surface of the outer locking rib 53 of the first embodiment. The locking groove 62 has an inner groove side surface 72a and an outer groove side surface 72b. The inner groove side surface 72a of the locking groove 62 corresponds to the back surface of the inner locking rib 52 of the first embodiment. The outer groove side surface 72b of the locking groove 62 corresponds to the opposing surface of the outer locking rib 54 of the first embodiment.

In addition, the pair of locking grooves 61 and 62 include portions 61a and 62a located in the second cylinder portion 42, portions 61b and 62b located on the upstream side of the third cylinder portion 43, and portions 61c and 62c located on the downstream side of the third cylinder portion 43 in the axial direction. The portions 61a and 62a correspond to the portions 51a, 53a, 52a, and 54a in the first embodiment. The portions 61b and 62b correspond to the portions 51b, 53b, 52b, and 54b in the first embodiment. The portions 61c and 62c correspond to the portions 51b, 53c, 52b, and 54c in the first embodiment.

FIG. 21 to FIG. 26 show a method of assembling the refueling port body 11 and the nozzle guide 12 and the assembled state thereof. As described above, as the locking portion 35, the locking ribs 51 to 54 in the first embodiment are changed to the locking grooves 61 and 62. The tips of the pair of guide ribs 23 and 24 in the protruding direction are inserted into the pair of locking grooves 61 and 62. Then, as shown in FIG. 21 to FIG. 26, their functions are the same. Therefore, the refueling port 3 of the second embodiment achieves the same effect as the first embodiment.

(4. Refueling Port 3 of the Third Embodiment)

The refueling port 3 according to the third embodiment will be described with reference to FIG. 34. In the refueling port 3 of the first embodiment, the nozzle guide 12 includes the pair of inner locking ribs 51 and 52 and the pair of outer locking ribs 53 and 54. Then, the pair of outer locking ribs 53 and 54 have tapered portions on the downstream side, and the pair of inner locking ribs 51 and 52 are formed to be parallel to the axial direction of the guide cylinder portion 31.

Figure 34:
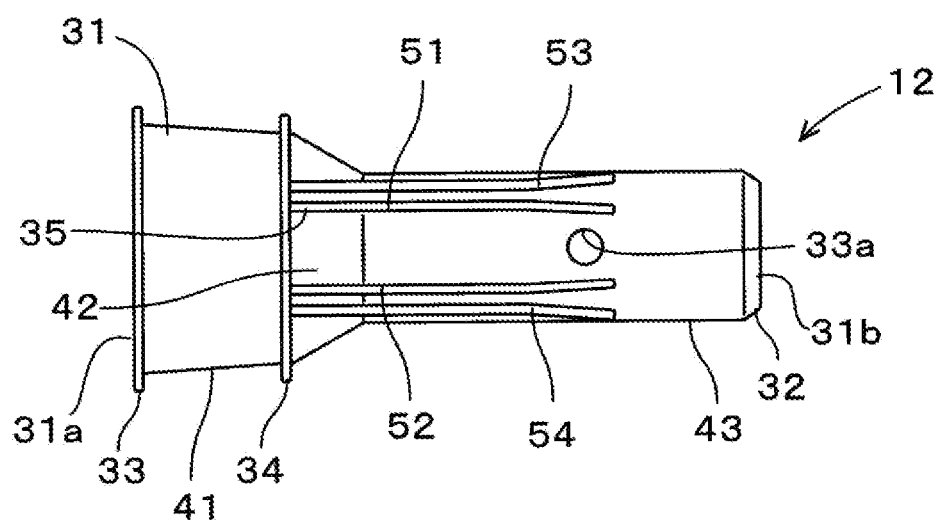
FIG. 34 is a view of a nozzle guide constituting a refueling port according to the third embodiment as viewed from above.

As shown in FIG. 34, regarding the nozzle guide 12 in the refueling port 3 in this embodiment, not only the pair of outer locking ribs 53 and 54 but also the pair of inner locking ribs 51 and 52 have tapered portions on the downstream side, which facilitates the insertion when inserting the nozzle guide 12 into the refueling port body 11.

(5. Refueling Port 3 of the Fourth Embodiment)

Figure 35:
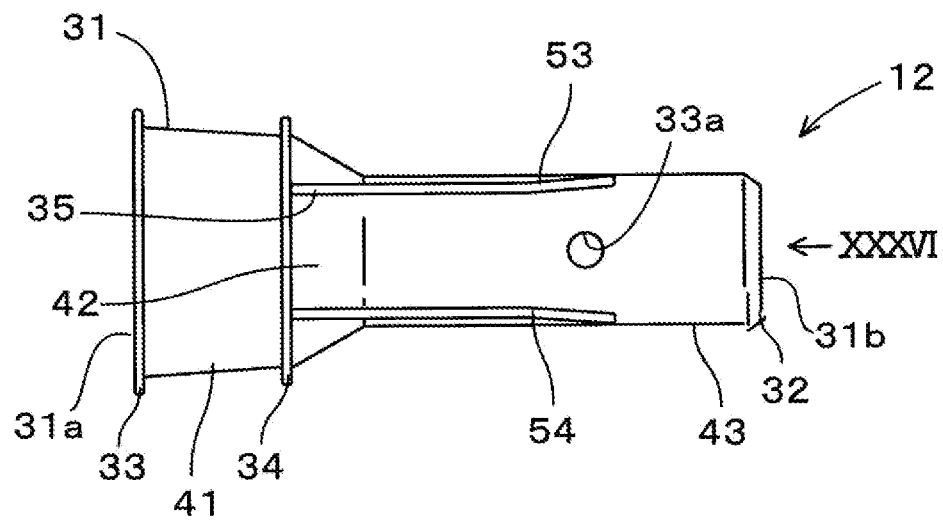
FIG. 35 is a view of a nozzle guide constituting a refueling port according to the fourth embodiment as viewed from above.
Figure 36:
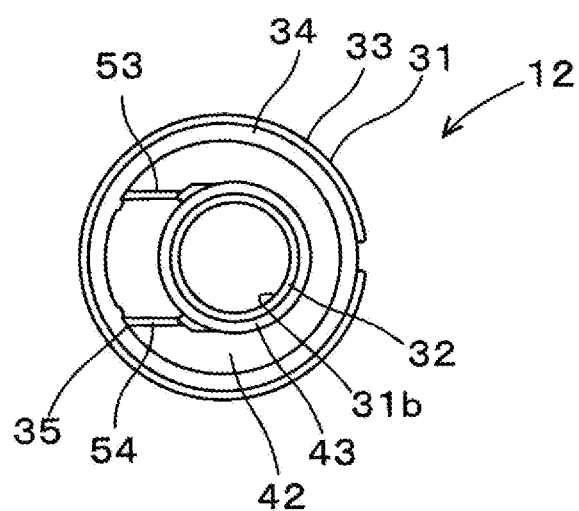
FIG. 36 is a view of the nozzle guide as viewed from the side opposite to a nozzle insertion port, and is a view as viewed from the direction XXXVI of FIG. 35 (right side of FIG. 35).

The refueling port 3 according to the fourth embodiment will be described with reference to FIG. 35 and FIG. 36. In the refueling port 3 of the first embodiment, the nozzle guide 12 includes the pair of inner locking ribs 51 and 52 and the pair of outer locking ribs 53 and 54.

In the refueling port 3 of the fourth embodiment, the nozzle guide 12 includes a pair of outer locking ribs 53 and 54 but does not include a pair of inner locking ribs 51 and 52. This embodiment also achieves the same effect as the first embodiment. However, the first embodiment is superior in terms of the insertability, locking force, and force for restricting the circulation of fuel vapor in the circumferential direction.

(6. Refueling Port 3 of the Fifth Embodiment)

Figure 37:
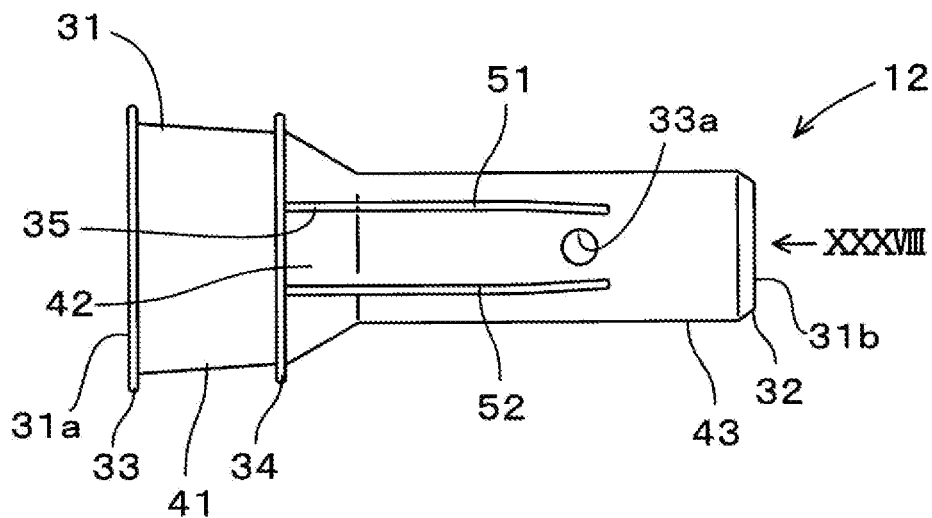
FIG. 37 is a view of a nozzle guide constituting a refueling port according to the fifth embodiment as viewed from above.
Figure 38:
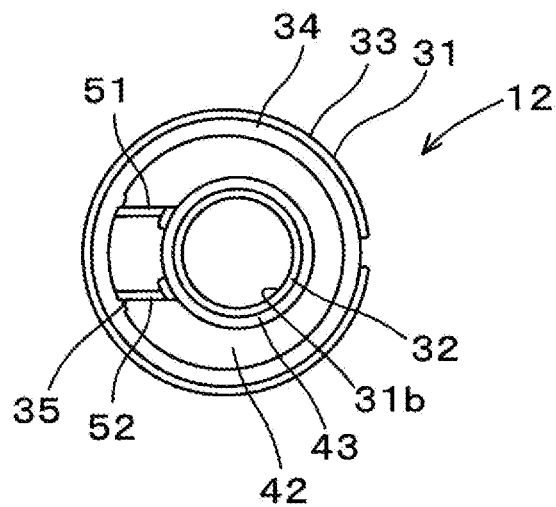
FIG. 38 is a view of the nozzle guide as viewed from the side opposite to a nozzle insertion port, and is a view as viewed from the direction XXXVIII of FIG. 37 (right side of FIG. 37).
Figure 39:
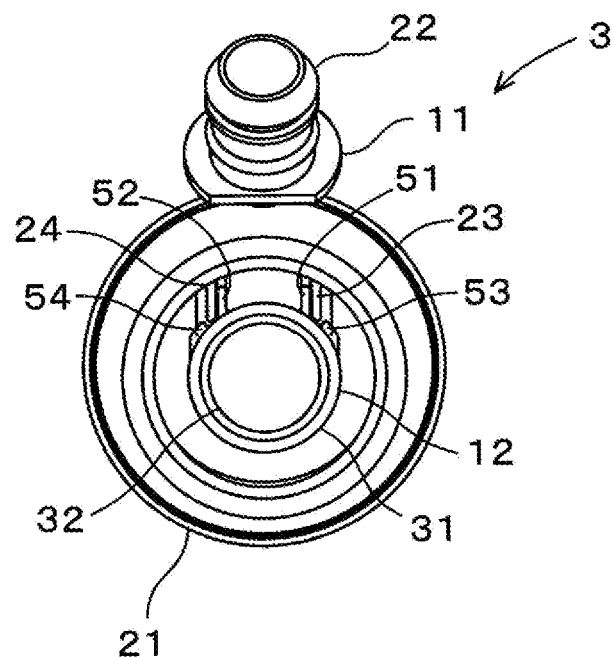
FIG. 39 is a view of a refueling port according to the sixth embodiment as viewed from the side opposite to a nozzle insertion port, and is a view corresponding to FIG. 3 of the first embodiment.
Figure 40:
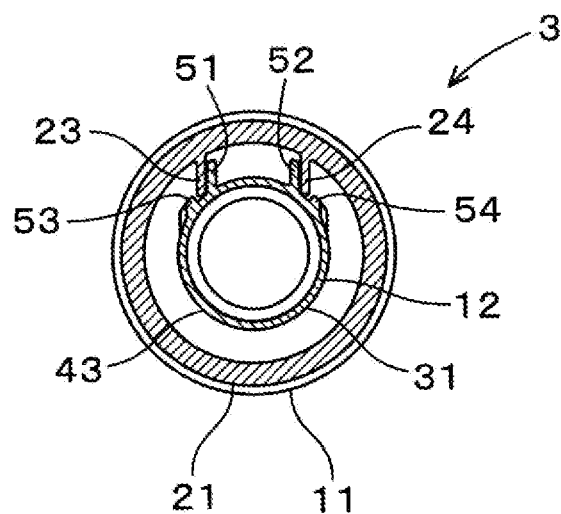
FIG. 40 is a radial cross-sectional view of the refueling port according to the sixth embodiment, and is a view corresponding to FIG. 8 of the first embodiment.
Figure 41:
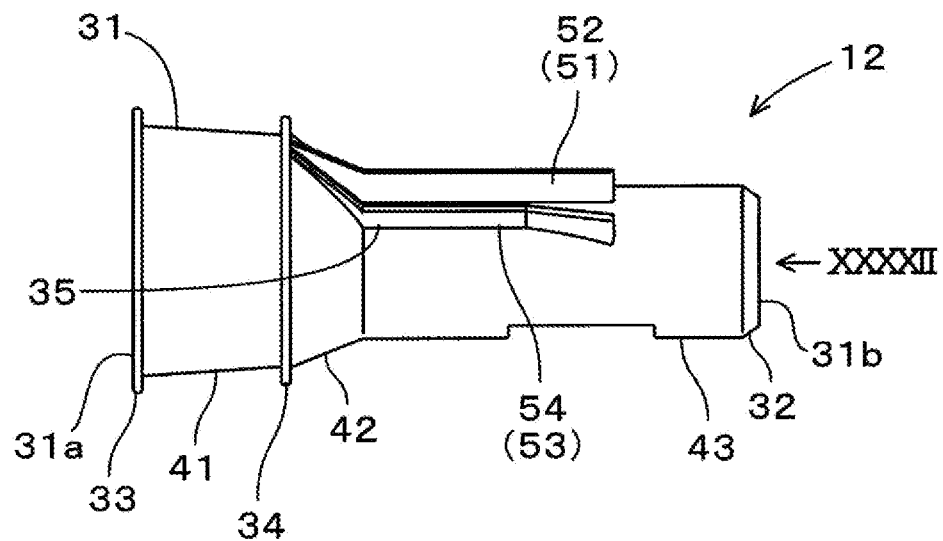
FIG. 41 is a side view of a nozzle guide constituting the refueling port according to the sixth embodiment.
Figure 42:
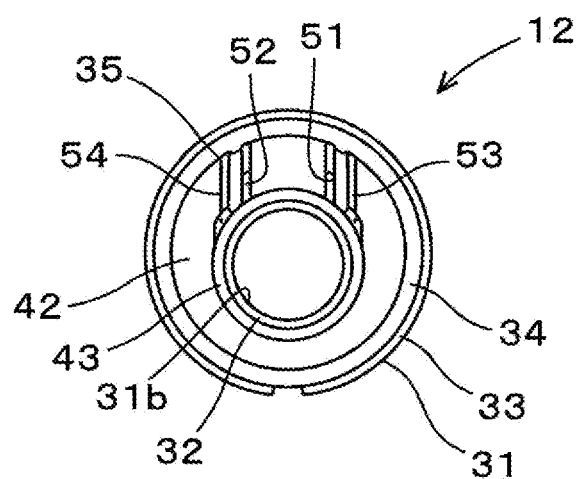
FIG. 42 is a view of the nozzle guide as viewed from the side opposite to a nozzle insertion port, and is a view as viewed from the direction XXXII of FIG. 41 (right side of FIG. 41).

The refueling port 3 according to the fifth embodiment will be described with reference to FIG. 37 and FIG. 38. In the refueling port 3 of the third embodiment shown in FIG. 34, the nozzle guide 12 includes the pair of inner locking ribs 51 and 52 and the pair of outer locking ribs 53 and 54.

In the refueling port 3 of the fifth embodiment, the nozzle guide 12 includes a pair of inner locking ribs 51 and 52 but does not include a pair of outer locking ribs 53 and 54. This embodiment also achieves the same effect as the third embodiment. However, the third embodiment is superior in terms of the insertability, locking force, and force for restricting the circulation of fuel vapor in the circumferential direction.

(7. Refueling Port 3 of the Sixth Embodiment)

The refueling port 3 according to the sixth embodiment will be described with reference to FIG. 39 to FIG. 42. In the refueling port 3 of the first embodiment, the pair of inner locking ribs 51 and 52 and the pair of outer locking ribs 53 and 54 of the nozzle guide 12 are locked only to the tips of the pair of guide ribs 23 and 24 in the protruding direction.

Regarding the nozzle guide 12 of this embodiment, the protruding heights of the pair of inner locking ribs 51 and 52 are increased. In other words, the pair of inner locking ribs 51 and 52 are locked in a range from the tips of the pair of guide ribs 23 and 24 in the protruding direction to the middle portion of the pair of guide ribs 23 and 24 in the protruding direction. In other words, the locking range is large.

According to this embodiment, the locking force provided by the pair of inner locking ribs 51 and 52 is increased. Further, the visibility of the locking portion for the operator is improved. Additionally, it is possible to further suppress the fuel vapor flowing in from the reflux port 21c from circulating in the circumferential direction.

In this embodiment, only the heights of the pair of inner locking ribs 51 and 52 are increased. Instead, only the heights of the pair of outer locking ribs 53 and 54 may be increased. Furthermore, both the heights of the pair of inner locking ribs 51 and 52 and the pair of outer locking ribs 53 and 54 may be increased.

(8. Others)

In the above, the locking ribs and the locking grooves serving as the locking portion 35 are made to extend in the axial direction. Instead, the locking ribs and the locking grooves may each be a local protrusion or a local recess rather than extending in the axial direction. In this case, the locking protrusion and the locking recess serving as the locking portion 35 are locked only to a part of the guide ribs 23 and 24.

Further, in the above, the body cylinder portion 21 of the refueling port body 11 is provided with the guide ribs 23 and 24, and the nozzle guide 12 is provided with the locking portion 35. Instead, the nozzle guide 12 may be provided with the guide ribs 23 and 24, and the body cylinder portion 21 of the refueling port body 11 may be provided with the locking portion 35. However, from the viewpoint of visibility, the configuration in which the body cylinder portion 21 of the refueling port body 11 is provided with the guide ribs 23 and 24 is superior.

What is claimed is:

1. A refueling port, comprising:
a refueling port body which is formed for inserting a nozzle of a refueling gun and to which a filler pipe is connected; and
a nozzle guide which is cylindrical and arranged inside the refueling port body for guiding the nozzle,
wherein the refueling port body comprises a body cylinder portion that is formed in a cylindrical shape and has a nozzle insertion port which is located at one end for inserting the nozzle, a filler pipe connection port which is located at the other end and connected to the filler pipe, and a reflux port which is folioed on a peripheral surface and into which fuel vapor recirculated via a breather pipe flows,
the nozzle guide comprises:
a guide cylinder portion which is formed in a cylindrical shape and arranged with an outer peripheral surface facing the reflux port inside the body cylinder portion; and
a backflow suppression portion which is formed to protrude outward in a radial direction from the outer peripheral surface of the guide cylinder portion and extend in a circumferential direction of the guide cylinder portion and is in contact with a position on an inner peripheral surface of the body cylinder portion on a nozzle insertion port side with respect to the reflux port,
wherein one of the refueling port body and the nozzle guide comprises a pair of guide ribs which are formed between the inner peripheral surface of the body cylinder portion and the outer peripheral surface of the guide cylinder portion to sandwich the reflux port in the circumferential direction and guides the fuel vapor flowing in from the reflux port in a direction toward the filler pipe connection port, and
the other one of the refueling port body and the nozzle guide comprises a pair of locking ribs or a pair of locking grooves, which are formed between the inner peripheral surface of the body cylinder portion and the outer peripheral surface of the guide cylinder portion and are locked in both directions in the circumferential direction to the pair of guide ribs to restrict relative rotation between the refueling port body and the nozzle guide.

2. The refueling port according to claim 1, wherein the pair of guide ribs and the pair of locking ribs or the pair of locking grooves have a locking position that is located on an inner side in the radial direction with respect to an inner peripheral surface of the filler pipe connecting port of the body cylinder portion, is located on an outer side in the radial direction with respect to an outer peripheral surface of an end opposite to the nozzle insertion port in the guide cylinder portion of the nozzle guide, and is provided at a position visible from a filler pipe connection port side.

3. The refueling port according to claim 1, wherein the refueling port body comprises the pair of guide ribs,
the pair of guide ribs protrude inward in the radial direction from the inner peripheral surface of the body cylinder portion,
the nozzle guide comprises the pair of locking ribs or the pair of locking grooves, and
the pair of locking ribs or the pair of locking grooves are a pair of locking ribs that protrude outward in the radial direction from the outer peripheral surface of the guide cylinder portion and extends in an axial direction of the guide cylinder portion.

4. The refueling port according to claim 3, wherein each of the pair of locking ribs is formed to be lower than a protruding height of each of the pair of guide ribs.

5. The refueling port according to claim 4, wherein each of the pair of locking ribs is locked only to a tip of each of the pair of guide ribs in a protruding direction.

6. The refueling port according to claim 4, wherein each of the pair of locking ribs is locked in a range from the tip of each of the pair of guide ribs in the protruding direction to a middle portion of each of the pair of guide ribs in the protruding direction.

7. The refueling port according to claim 3, wherein the pair of locking ribs comprise a pair of inner locking ribs that are arranged on opposing surface sides of the pair of the guide ribs respectively for the pair of the guide ribs.

8. The refueling port according to claim 3, wherein the pair of locking ribs comprise a pair of outer locking ribs that are arranged on back surface sides of surfaces, where the pair of the guide ribs face each other, respectively for the pair of the guide ribs.

9. The refueling port according to claim 3, wherein the pair of locking ribs comprise:
inner locking ribs that are arranged on opposing surface sides of the pair of the guide ribs for the pair of guide ribs; and
outer locking ribs that are arranged on back surface sides of surfaces, where the pair of the guide ribs face each other, for the pair of guide ribs.

10. The refueling port according to claim 7, wherein the pair of guide ribs are formed to extend in parallel to the axial direction of the body cylinder portion, and
the inner locking ribs comprise tapered portions that are inclined with respect to the axial direction of the guide cylinder portion at the end opposite to the nozzle insertion port and are inclined in a direction away from opposing surfaces of the pair of guide ribs toward a side opposite to the nozzle insertion port.

11. The refueling port according to claim 8, wherein the pair of guide ribs are formed to extend in parallel to the axial direction of the body cylinder portion, and
the outer locking ribs comprise tapered portions that are inclined with respect to the axial direction of the guide cylinder portion at the end opposite to the nozzle insertion port and are inclined in a direction away from back surfaces of the pair of guide ribs toward a side opposite to the nozzle insertion port.

12. The refueling port according to claim 1, wherein the refueling port body comprises the pair of guide ribs,
the pair of guide ribs protrude inward in the radial direction from the inner peripheral surface of the body cylinder portion,
the nozzle guide comprises the pair of locking ribs or the pair of locking grooves, and
the pair of locking ribs or the pair of locking grooves are the pair of locking grooves, each of pair of the locking grooves is formed on the outer peripheral surface of the guide cylinder portion and extends in an axial direction of the guide cylinder portion and into which a tip of the guide rib in a protruding direction is inserted.

13. The refueling port according to claim 12, wherein the pair of locking ribs or the pair of locking grooves comprise the pair of the locking grooves into which tips of the pair of the guide ribs in the protruding direction are inserted respectively.

14. The refueling port according to claim 12, wherein the pair of guide ribs are formed to extend in parallel to the axial direction of the body cylinder portion, and the locking grooves have:
- inner groove side surfaces located on opposing surface sides of the pair of the guide ribs for the pair of guide ribs; and
- outer groove side surfaces located on back surface sides of surfaces, where the pair of the guide ribs face each other, for the pair of guide ribs, wherein the inner groove side surfaces comprise tapered portions which are inclined with respect to the axial direction of the guide cylinder portion at the end opposite to the nozzle insertion port and are inclined in a direction away from opposing surfaces of the pair of guide ribs toward a side opposite to the nozzle insertion port.

15. The refueling port according to claim 12, wherein the pair of guide ribs are formed to extend in parallel to the axial direction of the body cylinder portion, and the locking grooves have:
- inner groove side surfaces located on opposing surface sides of a pair of the guide ribs for the pair of guide ribs; and
- outer groove side surfaces located on back surface sides of surfaces, where the pair of the pair of guide ribs face each other, for the pair of guide ribs, wherein the outer groove side surfaces comprise tapered portions which are inclined with respect to the axial direction of the guide cylinder portion at the end opposite to the nozzle insertion port and are inclined in a direction away from opposing surfaces of the pair of guide ribs toward a side opposite to the nozzle insertion port.

16. The refueling port according to claim 1, wherein the nozzle guide further comprises a nozzle stopper which protrudes inward in the radial direction from the end of the guide cylinder portion opposite to the nozzle insertion port to come into contact with a tip of the nozzle inserted.

* * * * *